United States Patent
Helms et al.

(10) Patent No.: US 11,494,749 B2
(45) Date of Patent: Nov. 8, 2022

(54) LOCATION-BASED AUTOMATIC COMPILATION OF CHARGES ACCRUED FOR VENUE PROVIDED GOODS/SERVICES

(71) Applicant: Radius Networks Inc., Washington, DC (US)

(72) Inventors: David Helms, Arlington, VA (US);
Marc Wallace, Arlington, VA (US);
Scott Yoder, Washington, DC (US);
Christopher Sexton, McLean, VA (US)

(73) Assignee: Radius Networks, Inc., Washington, DC (US)

( * ) Notice: Subject to any disclaimer, the term of this patent is extended or adjusted under 35 U.S.C. 154(b) by 139 days.

(21) Appl. No.: 16/833,517

(22) Filed: Mar. 28, 2020

(65) Prior Publication Data

US 2021/0304169 A1 Sep. 30, 2021

(51) Int. Cl.
*G06Q 20/14* (2012.01)
*G06Q 20/32* (2012.01)
*G06Q 50/12* (2012.01)

(52) U.S. Cl.
CPC ....... *G06Q 20/145* (2013.01); *G06Q 20/3223* (2013.01); *G06Q 20/3224* (2013.01); *G06Q 50/12* (2013.01)

(58) Field of Classification Search
CPC .............................. G06Q 20/145; G06Q 50/12
See application file for complete search history.

(56) References Cited

U.S. PATENT DOCUMENTS

| | | | |
|---|---|---|---|
| 8,326,260 B1 | 12/2012 | Bradish et al. | |
| 8,989,094 B2 | 3/2015 | Bradish et al. | |
| 9,408,060 B2 | 8/2016 | Helms et al. | |
| 10,484,831 B1 | 11/2019 | Helms et al. | |

(Continued)

FOREIGN PATENT DOCUMENTS

| | | | | |
|---|---|---|---|---|
| CN | 106557968 A | * | 4/2017 | ......... G06Q 30/0635 |
| EP | 3819834 A1 | * | 5/2021 | ........... G06F 3/0219 |
| WO | 2015042065 A1 | | 3/2015 | |

OTHER PUBLICATIONS

Kenley et al., "Reducing Risk: Location Based Micro-Milestone Payments and Auto-Generation of Subcontractor Payment Processes," 16th Pacific Association of Quantity Surveyors Congress Innovating, and Sustaining: Challenges and Opportunities (Jul. 7-10, 2012). (Year: 2012).*

(Continued)

*Primary Examiner* — Virpi H Kanervo
(74) *Attorney, Agent, or Firm* — Lee & Hayes, P.C.

(57) ABSTRACT

Technology is disclosed for automatically building an expandable invoice for incurred charges based on recognition of charge-incurring activities by persons whose specific identities are not known via the activity recognition process. A separate process detects location of sourcing and time for a Patron-presence and Patron-identifying Advertising radio Signal (P/PAS) repeatedly broadcast by a P/PAS emitter possessed by each participating patron. Records from the two processes are matched and combined based on substantial proximity in time and space for the activity recognition and the presence detection. Payment on a pay-go-whenever-ready (PGWeR) basis is enabled with use of the built invoice. A patron can pay and leave whenever ready to do so without need for intervention by an on premise staff member.

14 Claims, 11 Drawing Sheets

(56) References Cited

U.S. PATENT DOCUMENTS

| | | | |
|---|---|---|---|
| 2005/0049940 A1* | 3/2005 | Tengler | G06Q 10/087 |
| | | | 705/21 |
| 2005/0204061 A1 | 9/2005 | Farchmin | |
| 2013/0009821 A1 | 1/2013 | Steer et al. | |
| 2013/0080218 A1 | 3/2013 | Wildern, IV et al. | |
| 2014/0274136 A1 | 9/2014 | Edge | |
| 2015/0186941 A1 | 7/2015 | Anthony et al. | |
| 2015/0215762 A1 | 7/2015 | Edge | |
| 2016/0337796 A1 | 11/2016 | Pandharipande et al. | |
| 2017/0055112 A1 | 2/2017 | Wetphal et al. | |
| 2017/0075518 A1 | 3/2017 | Ramakrishna et al. | |
| 2017/0083893 A1* | 3/2017 | Beyer | G06Q 20/3223 |
| 2017/0265046 A1 | 9/2017 | Chen | |
| 2018/0048996 A1* | 2/2018 | Ciecko | H04W 4/021 |
| 2018/0075518 A1 | 3/2018 | Werbitt | |
| 2018/0220265 A1 | 8/2018 | Helms et al. | |

OTHER PUBLICATIONS

Grocery Retail Online, "ShopperKit Adds FlyBuy Pickup To Create Seamless Curbside Experience", Aug. 13, 2019, https://www.groceryretailonline.com/doc/shopperkit-adds-flybuy-pickup-to-create-seamless-curbside-experience-0001.
Skip, "Checkout On Your Phone", 2018, downloaded from Internet on Feb. 5, 2020, https://getskip.com/.
Anne D'Innocenzio, "Why Scan-and-Go Technology Is Surging in More Grocery Stores", Feb. 23, 2018, https://www.inc.com/associated-press/supermarket-chain-stores-new-technology-scan-go-customers-amazon-phone-app.html.
Nancy Parode, "How to Use the Airport's Self-Service Check-In Kiosks", Nov. 26, 2019, https://www.tripsavvy.com/airports-self-service-checkin-kiosks-2973028.
Electronicsnotes, "Yagi Antenna/Yagi-Uda Aerial", downloaded from Internet on Feb. 5, 2020, https://www.electronics-notes.com/articles/antennas-propagation/yagi-uda-antenna-aerial/basics-overview.php.
Xirio Online, "Radio Receiver/Terminal Parameters", downloaded from Internet on Feb. 5, 2020, https://www.xirio-online.com/help/en/rx_radio_params.html.
Wikipedia, "Antenna (radio)", downloaded from Internet on Feb. 5, 2020, https://en.wikipedia.org/wiki/Antenna_(radio)#Characteristics.
Office Action dated Jun. 30, 2020 in U.S. Appl. No. 16/681,559.
PCT Search Report and Written Opinion dated Jun. 29, 2021 for PCT Application No. PCT/US21/21981, 12 pgs.

* cited by examiner

LOCATION-BASED AUTOMATIC COMPILATION OF CHARGES ACCRUED FOR VENUE PROVIDED GOODS/SERVICES

CROSS REFERENCES

The disclosures of the following US applications are incorporated herein by reference in their entireties: (1) U.S. Provisional Application No. 62/453,872, filed Feb. 2, 2017; (2) U.S. patent application Ser. No. 15/884,132, filed Jan. 30, 2018 originally entitled "WIRELESS LOCATOR SYSTEM" and claiming priority to said Provisional Application No. 62/453,872; (3) U.S. patent application Ser. No. 16/232,849 filed Dec. 26, 2018 originally entitled LOCAL EPHEMERAL LOCATION TRACKING OF MOBILE DEVICE USERS; (4) U.S. patent application Ser. No. 16/265,786 filed Feb. 1, 2019 originally entitled "Location Sensitive Queues Management"; (5) U.S. patent application Ser. No. 16/725,262 filed Dec. 23, 2019 originally entitled "High Confidence Isolated Presence Detection In Fine Resolution Region"; and (6) U.S. patent application Ser. No. 16/783,087 filed Feb. 5, 2020 originally entitled "Associating Prior Arrangements with On-Premise Manual Transactions and Concomitant Presence of Actor's Presence-Advertising Emitter in Fine Resolution Region".

BACKGROUND

There is a growing demand for customer-centric and timely processing with respect to goods and/or services provided at the premises of a goods/services provider. More specifically, providers are asked to provide desired or requested goods and/or services in timely and high quality manner to online pre-requestors and to on-premise requesting customers and to also respect time pressures to which the customers are subject. Customer relations may suffer if a patron is made to wait for unexpected long times, is repeatedly asked for same information such as the customer's identification, is asked to accept inferior servicing or has his/her orders mixed up with that of another.

By way of a nonlimiting example, a sit-down food restaurant may offer a multitude of queuing options for customers as they wait to place orders, wait for the ordered items to arrive, consume the items and ultimately pay for those items and then leave. More specifically, a restaurant may have a front end welcoming area where customers are greeted and asked to identify themselves and to specify their dining preferences and/or requirements. Such preference/requirement specifications may include indicating the number of guests to be accommodated, the types of customers (e.g., toddlers, older children, adults, disabled), the types of seats/tables that are acceptable (e.g., booth, round table versus rectangular table, types of seats (tall, low, with arm rests, for small child, space for wheel chair etc.), the desired ambiance (e.g., outdoor, indoor, nonsmoking, at bar, etc.) and so on. If a desired option is not immediately available (e.g., booth seating for 6 patrons), the customers may be directed to a waiting area (e.g., an alcohol-serving bar, an appetizer providing small tables area, etc.) where they can wait and at the same time optionally order some small pre-meal items (e.g., alcoholic or other drinks, bread/butter and appetizers).

A first staff member (e.g., receptionist) may handle the first set of orders optionally placed by the incoming customers when in the greeting area. Then, if or when the customers move to a subsequent queuing area (e.g., the bar), a second staff member (e.g., bartender, floating waitress, etc., who does not necessarily know each customer's name) may handle a secondary set of orders placed by the customers when in that next area. Later as the customers move to their desired main dining location (e.g., indoor booth for 6), a third staff member (e.g., waitress dedicated to that dining section) may handle the major set of orders (e.g., full course meals) placed by the customers. Optionally, the customers may subsequently ask to move to an outdoor seating area for desserts, after-meal drinks, smoking and so on where a fourth staff member (e.g., outside servicing waitress) may handle their correspondingly placed orders.

When the customers complete their order placing activities (charges accruing activities) and their consumption of the various items (or packing some to take home), they will want to ask for the tallied-up total bill, pay it and leave. Sometimes they desire that this last set of actions be performed in a hurry because they have a near term next appointment to reach (e.g., a theater performance beginning in half an hour and for which they already purchased tickets). At this point, in a conventional environment; an available staff member has to be summoned for the task and has to be told about the time pressure as well as being provided with necessary further information (e.g., the customer's identifications). Then, all the order slips from the various order-takers and/or order-receiving locations have to be found and accumulated for the group or for individual subsets of the customers. The order slips have to be sorted, totaled, listed on a print out, and the listing has to be returned to the respective payment-handling customers for their review, approval and payment. Then when review is finished, the same or a further available staff member has to be summoned for picking up the credit cards, gift cards and/or cash, picking up the approved bill slips, running them through the establishment's financial processing system and returning the finalized payment documents (and optional change) to the respective customers. If the customers are made to wait too long and/or if their orders get mixed up with those of others, they may become discouraged and not return to the establishment in the future. Solutions are needed.

It is to be understood that some concepts, ideas and problem recognitions provided in this description of the Background may be novel rather than part of the prior art.

BRIEF SUMMARY

Technology is disclosed herein for automatically building an expandable invoice for incurred charges based on recognition of charge-incurring activities by persons whose specific identities are not inherently known via the activity recognition process. A separate process detects location of sourcing and time of detection for a Patron-presence and Patron-identifying Advertising radio Signal (P/PAS) repeatedly broadcast by a P/PAS emitter possessed by each participating patron. Records from the two processes are matched and combined based on substantial proximity in time and space for the activity recognition and the presence detection. Payment on a pay-go-whenever-ready (PGWeR) basis is enabled with use of the built invoice. A patron can pay and leave whenever ready to do so without need for intervention by an on premise staff member.

More specifically and in one embodiment, an automated method is provided for managing and building a running tab for charge-incurring activities to be associated with a first patron present on premises of a provider of goods and/or services (goods/services provider) where the method is a machine-implemented one comprising: (a) automatically detecting presence at a first time of a first P/PAS emitting device (a device that repeatedly broadcasts a Patron-presence and Patron-identifying Advertising radio Signal) possessed by the first patron in a first area of the premises from where a charge-incurring activity can take place under a corresponding area-related context of the premises; (b) automatically recognizing occurrence at a second time (could be same as first time) of a potential charge-incurring activity in a second area of the premises (where the potential charge-incurring activity can be transformed into an actual charge-incurring activity or alternatively revoked due for example to non-delivery of ordered goods/services and the second area could be same as first area) where the recognition of the potential charge-incurring activity does not necessarily or inherently identify specifically who engaged in the potential charge-incurring activity; (c) automatically determining context-based substantial chronological proximity of the first time to the second time; (d) automatically determining context-based substantial spatial proximity of the first area to the second area; (e) automatically determining that the first area in which presence of the first P/PAS emitting device was detected did not, during the first time, include one or more P/PAS emitting devices possessed by unrelated other patrons present at the premises; (f) in response to said determining (c) of context-based substantial chronological proximity of the first time to the second time, to said determining (d) of context-based substantial spatial proximity of the first area to the second area and to said determining (e) of exclusion of the one or more P/PAS emitting devices possessed by the unrelated other patrons from the first area during the first time, matching an identification of the first patron or identification of the first P/PAS emitting device with the potential charge-incurring activity recognized to have occurred in the second area; and (g) creating a combination record that combines the matched identification of the first patron or identification of the first P/PAS emitting device with the recognized potential charge-incurring activity detected in the second area and adding the created combination record to a stored running tab for potential charge-incurring activities associated with the first patron. (It will become clearer in the below that typically more than one of the presence detection records (R1 records) can be automatically repeatedly generated at a relatively rapid rate and more than one of these presence detection records can substantially match with one of the charge-incurring activity recognition records. In such cases, the created combination record can be derived from an averaging of or other alike combining (e.g., finding a median) of the substantially matched plural presence detection records (R1 records). Also it is to be understood that designation of R1 and R2 records as first and second in the drawings is for purpose of illustration and that other distinctions can be used elsewhere within this disclosure.)

The so-built running tab for potential charge-incurring activities associated with the first patron may be used to enable patron departure from the premises of the goods/services provider on a pay-go-whenever-ready (PGWeR) basis without need for assistance from staff members of the provider's premises.

In one embodiment, there is further provided a machine-implemented method that provides high confidence, isolated presence detection in a specific region of interest (first area) of a radio emitter of a repeatedly broadcast patron-presence and patron-identifying advertising signal (hereinafter "P/PAS" and also "P/PA-signal"). The method automatically correlates the patron-identity and the location of isolated detection with a substantially cotemporaneous recognition of charge-incurring activity that takes place in a second area proximate to and/or overlapping the specific region of interest (first area). The P/PAS could be a Bluetooth beacon signal, a UWB signal or another beacon signal (e.g., one emitted from a wrist-worn device or otherwise user-possessed device). Any repeatedly broadcast radio signal that can be detected as specifically indicating presence of its emitter in a relevant finite area (in the first area) and uniquely identifying the emitter (and thereby identifying its possessor) can serve as a P/PAS.

In one embodiment, the method further comprises: (a') simultaneously receiving at two or more co-located directional antennas that are coupled to respective radio receivers, a presence-advertising and emitter-identifying signal (P/PAS) that has been broadcast from a P/PAS emitter disposed in or near to a region of interest (first area) adjacent to the co-located directional antennas, the region of interest being one that in one embodiment is overlapped by partial parts of reception sensitivity lobes of the directional antennas; (b') obtaining signal strength indications (e.g., RSSI's) from the respective radio receivers; (c') producing a difference signal representative of a difference between two of the obtained signal strength indications of the respective antennas; (d') producing an average signal representative of a running average of two or more of the obtained signal strength indications; (e') producing a normalized signal strength signal using a ratio that includes the difference signal on one side of the ratio (e.g., the numerator side) and the average signal on an opposed side of the ratio (e.g., the denominator side); (f) generating a confidence signal based on the normalized signal strength signal, the confidence signal indicating a level of confidence that the P/PAS emitter is disposed inside the region of interest or alternatively indicating a level of confidence that the P/PAS emitter is disposed outside the region of interest; and (g') taking an action or avoiding an action based on the confidence signal. In one embodiment, the action includes associating a possessor of the P/PAS emitting device with an order for a product and/or a service recognized at substantially the same time and as having taken place in an area (second area) overlapping with or substantially adjacent to the first area where the P/PAS emitter was detected as being contemporaneously disposed.

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

DETAILED DESCRIPTION

Figure 1A:
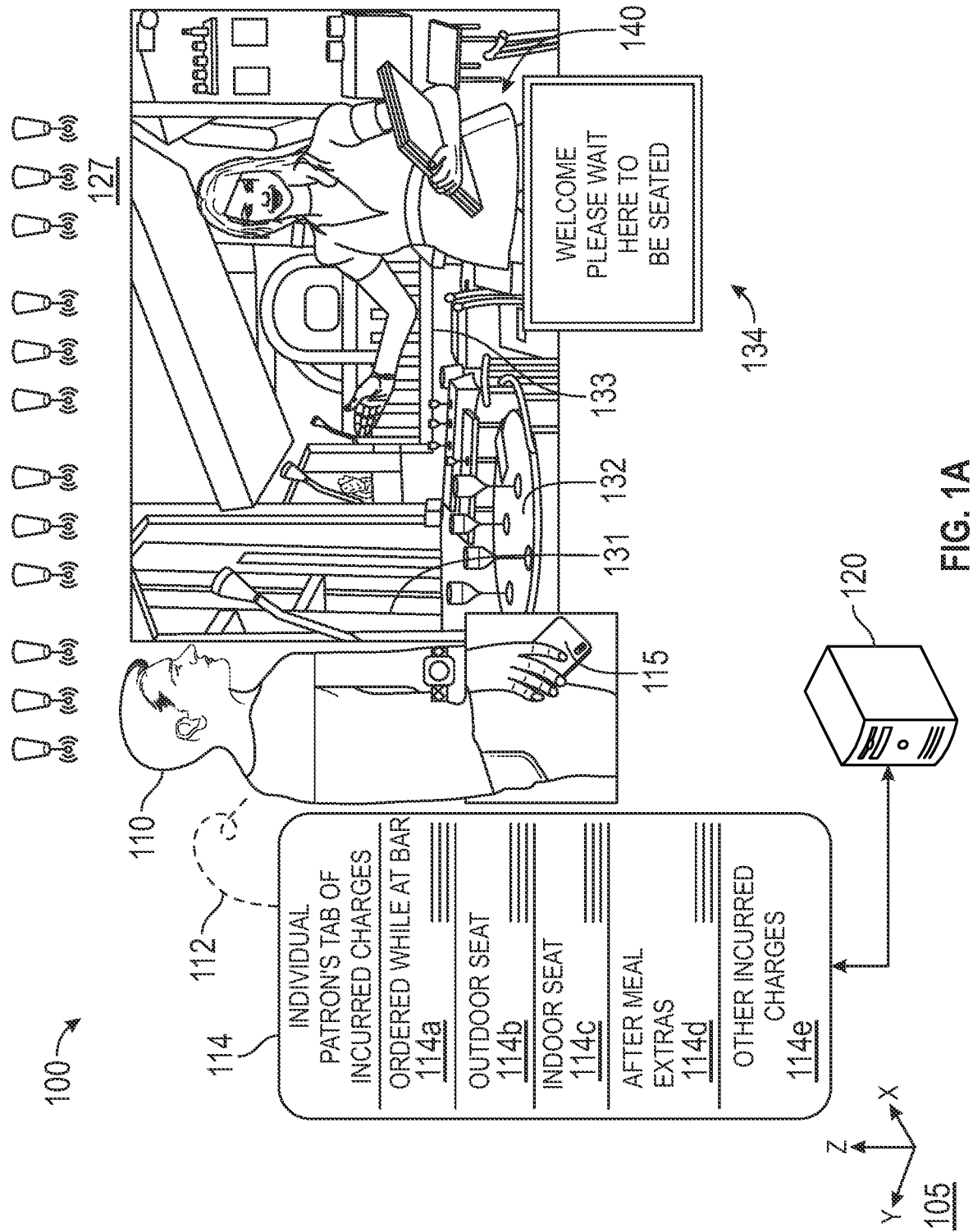
FIG. 1A is a schematic diagram of a first environment in which a customer's tab for placed orders may expand over time as the customer places orders (or engages in other charge-accruing activities) and/or moves from one on-premise location to another.

The disclosure relates to technology using resources of wireless networks and personal mobile communicators to detect presence and identity of requestors for and/or recipients of goods and/or services at one or more locations of provider premises based on detection of an emitter of a repeatedly broadcast Patron-presence and Patron-identifying Advertising radio Signal (P/PAS) associated with the order-placer/recipient (patron). More specifically, an over time first mapping is compiled of where and when orders are recognized as having been placed by not-necessarily specifically-identified patrons within the provider's premises for goods/services (or other charge-incurring activities are recognized as having taken place). An example of a not-necessarily specifically-identified patron is where a bartender at a restaurant bar area serves a drink to a patron seated at an identifiable bar stool but does not know the full name and address or other such specific identifier of that specific patron. To compensate for this shortcoming, an over time second mapping is further compiled of where specifically-identified and potential order placing persons (charge-incurrers) are detected as being present in an overlapping or substantially adjacent area (first area, A1) during a substantially overlapping duration of time (T1). A match is made as between the mapped first and second compilations of instances of recognized charge-incurring activities (in area A2 and time span T2) and of specific identities of potential patrons who were automatically detected as being present at substantially a same time (T1 or times T1's) and in an adjacent or overlapping first area (A1) because that first area contained a first P/PAS emitting device belonging to that patron (first patron) but the first area did not, during that time include one or more P/PAS emitting devices possessed by unrelated other patrons (e.g., not family members) who could also have been engaged in the charge-incurring activity. In other words, in response to automated determining of context-based substantial chronological proximity in records in the first and second mappings and in response to context-based substantial spatial proximity in records in the first and second mappings and while excluding instances where one or more P/PAS emitting devices possessed by the unrelated other patrons are present during the same time frame, a specific identification of a first patron or a specific/unique identification of a first P/PAS emitting device is matched (combined) with the potential charge-incurring activity recognized to have occurred in the basically same area. A combination record is then formed that combines the matched unique identification of the first patron or unique identification of the first P/PAS emitting device with the recognized potential charge-incurring activity detected in the area and the combination record is added to a stored running tab for potential charge-incurring activities associated with identification of the first patron. The combination record may be expanded to include further details about the nature or character of the order (and/or details of other charge-incurring activities) such as an identification of the order taker (or takers, some could be machines rather than humans), the taker's location(s), and the items ordered as well as additional relevant information. The information is recorded in a database server. Then, whenever the patron or another person responsible for payment (e.g., a minor's guardian) is ready to pay and leave, the responsible person (primary patron) calls up an application on his/her mobile device (often also that person's P/PAS emitter). The application asks the database server to consolidate all the orders placed or other charges incurred by or on behalf of the primary patron for the relevant time span since initial arrival at the premises and to generate an invoice. The application (a.k.a. pay-go-whenever-ready or "PGWeR" app) presents the invoice to the primary patron for review and approval. The application handles the submission of payments by the primary patron for the approved invoice. The application then indicates when processing of the payments (e.g., credit card submissions) has completed such that the primary patron and his/her companions are free to then leave the provider's premises. Importantly these departure enabling activities can be performed without participation by at-premise members of the provider's staff. Accordingly departure can be expedited since the primary patron does not have to find and hail a staff member, does not have to identify members of his/her party to the staff member, does not have to wait for the once-hailed staff member to find and consolidate the order slips, does not have to wait to find and hail a staff member a second time for processing the approved invoices and payments. The departure process is automatically expedited and therefore improved. Moreover, the goods/services provider does not have to hire additional staff for handling the pay-go-whenever-ready (PGWeR) departure activities. They are handled by automated equipment.

Additionally, and going back to the example of the bartender at the restaurant's bar area serving a drink to a patron seated at an identifiable bar stool but not knowing the specific/unique identifier of that specific patron (knowing him as "Joe" does not qualify), the system allows Joe to pick up his drink and return to his main dining table without first settling his bill with the bartender. The bartender does not have learn Joe's specific identity or involve himself in settling the bar bill with Joe. All that will be handles when the automatically generated and consolidated bill is produced. Thus Joe is saved the time and hassle of settling his bar bill there and then. The bartender is also saved the time and hassle of settling Joe's bar bill and can then more efficiently attend to the needs of other patrons. The transaction experience is improved for all involved.

In one embodiment, a mobile wireless communication device normally or routinely carried by a recipient of goods/services (e.g., the recipient's smartphone, smart watch or other such routinely carried or worn mobile device) is used to keep track of the location of the recipient at different times and in particular to detect high likelihood of presence of the recipient at specific order-placement originating locations. In the same or an alternate embodiment, the charge-incurring person (e.g., adult or child) wears a P/PA-signal emitting wrist band where the P/PA-signal identifies its wearer as well as indicating presence of the wearer in a scannable area.

For sake of brevity, "goods/services" will be used herein to refer to the provisioning of any one or more of goods, services and service providers as appropriate for a given context. The disclosure is not limited to restaurants. There are many other examples where customers indicate an intention to gain benefit of goods/services and to automatically pay for the correspondingly incurred charges at time of departure without need for intervention by a provider's staff member (PGWeR). Consider for example a customer walking a shopping cart about a supermarket or other such self-serve store. The customer approaches shelf or bin locations (item supports), removes specific items from those item supports at those locations and deposits those items into the cart without being yet bound to pay for them. The customer later decides he or she is ready to leave the premises or needs to immediately leave due to exigent circumstances. At that time and without interacting with a provider staff member, the customer calls up an application that automatically consolidates identification of all the removed items and generates an invoice for the items. The customer approves the invoice (particularly in cases where all the removed items are being kept) and automatically pays for them by way of an automated credit card transaction and/or another cashless payment system (e.g., gift cards) and then just leaves without intervention by another person.

While one example given here relates to moving about different queuing environments within a multi-counter restaurant and another to shopping in a self-serve store, the present teachings are not to be limited to just these few examples. There are many aspects of day to day living where recipients of goods/services incur charges on an as-you-go basis and then decide that time has arrived to pay and leave (PGWeR) where the recipients do not want to wait for a staff member to assist in the pay and go process. Further examples where similar kinds of issues typically arise include entertainment providing venues (e.g., where customers are served small food items and drinks while they watch a show, movie, etc.) and amusement park and/or arcade game room venues (e.g., where patrons enjoy real world or animated roller coaster rides, other rides, marine animal shows, etc.) [[more examples??? ]].

In accordance with one aspect of the present disclosure, patrons come with and/or are given or equipped with electronic presence and person-identification advertising signal emitters (P/PAS emitters) to carry about with them (e.g., to wear for example as a wrist band device) while in/on the premises of the goods/services provider. At each location where each patron can incur charges (for ordered and/or provided and/or taken goods/services), one or more first electronic records (Rts) are automatically created and stored identifying the time of presence detection, the location of presence detection and the specific identification of the patron and/or of his/her P/PAS emitting device. A second electronic record (R2) is further automatically generated identifying a substantially proximate location at which the goods/services are recognized as having been contemporaneously ordered and/or provided and/or taken (even in cases where the order-placer's identification is not known to the order-taker). A third electronic record (R3) is yet further automatically generated of charges contemporaneously (but reversibly) incurred for the ordered and/or provided and/or taken goods/services at the substantially same location. The first, second and third records are automatically matched to one another and used to generate a digital tally of charges incurred by each patron and the details (characteristics) of each charge-incurring activity. A person responsible for payment of the incurred charges (e.g., a primary patron) is given the ability to download the most current tally of the incurred charges, to review them and to automatically pay for some or all of the tallied charges without assistance from a provider's staff member.

In accordance with another aspect of the present disclosure, two or more high gain directional antennas are located next to one another (e.g., within a foot of one another) and aimed (more specifically, horizontally oriented divergently in one embodiment while having a same vertical inclination) to cover a fine resolution region of interest where a patron can be situated while incurring charges so that, in one embodiment, narrow partial portions of reception sensitivity lobes of the antennas overlap to thereby define the region of interest and isolate upon just one patron. (Note: it is believed that the overlapping of narrow fringe portions of the antenna sensitivity lobes may be responsible for the fine resolution detection and isolation observed with this system. However, applicants do not want to be bound by this belief. It works irrespective of the underlying theory.) In one embodiment, substantially cotemporaneous signal strength indications (e.g., RSSI's) are obtained from respective radio receivers (or a samples providing one radio receiver) to which the antennas respectively connect. A relative signal strength difference factor (|ΔRSSI|) is generated from the simultaneously or otherwise substantially contemporaneously received (e.g., sampled) signals of the co-located directional antennas. A running over-time average factor is also generated from the relative signal strengths of the simultaneously or otherwise substantially contemporaneously received signals. (As used herein, the term "substantially contemporaneously" covers simultaneously received radio signals and also those received at substantially the same time so as to allow for pinpointing where a currently stopped or slowly moving target emitter is located. The slowness of movement and degree of resolution for pinpointing will vary according to context.) A normalized signal strength value is derived using a ratio that includes on one side thereof (e.g., the numerator side) an absolute value of the difference factor (|ΔRSSI|) and on the other side thereof (e.g., the denominator side) includes the running average value (Avg(Rss1+ Rss2+ ... )). Thus, the absolute measure units of the receiver generated signal strength indications (RSSI's) substantially cancel out and a normalized signal strength value (NRss) is obtained. This normalized signal strength value (NRss) can be used for further data processing without having to account in the software for specific characteristics of the directional antennas and their respective radio receivers. In one embodiment, the relative signal strength difference and average values are obtained using the IEEE 802.11 RSSI (Relative Signal Strength Indication) data broadcast by protocol compliant wireless devices. In an alternate embodiment, the IEEE 802.11 RCPI (Received Channel Power Indicator) data is used. A somewhat generalized version of the normalized signal strength value may have the form:

$$NRss = 100 - \frac{|Rss1 - Rss2|}{\text{Avg}(Rss1 + Rss2)} \quad \text{Eq. (1)}$$

where for this example the 100 value is an arbitrarily picked maximum amount, where sampling for the Rss1 and Rss2 amounts is empirically determined based on the RSSI reporting frequencies of the utilized radio receivers (or samples-providing one receiver) and where the chronological window size for the running average factor is also empirically determined. It is within the contemplation of the present teachings to alternatively or additionally use an inverted ratio where the difference factor ($|\Delta RSSI|$) is in the denominator and the running average value (Avg(Rss1+ Rss2+ ... )) is in the numerator. When more than two directional antennas are used, the running average may be that of three or more of the respective receivers (or corresponding samples) while separate difference factors are generated pairwise for different permutations of the antennas. It is also within the contemplation of the present teachings to include various, empirically determined weighting factors and/or nonlinear functions for generating the normalized signal strength value (NRss) and the running average value (e.g., Avg(W1*Rss1+W2*Rss2+ ... )). The weighting factors may include antenna-favoring factors as disclosed later below.

When a P/PAS transmitter is located at the center of the fine resolution region of interest and equation Eq. 1 is used as the confidence level generating algorithm, the difference value ($\Delta RSS$) will be at or near zero and the NRss factor will be at its maximum (e.g., NRss=100 in the case of exemplary equation Eq. 1). Also, when the average value (Avg(Rss1+ Rss2+ ... )) is relatively high, meaning the signal of the targeted P/PAS emitter is not attenuated; the NRss factor will approach its maximum (e.g., NRss=100), When the PAS transmitter is located at one or the other of the ingress or egress sides of the fine resolution region and equation Eq. 1 is used as the confidence level generating algorithm, the absolute difference value ($|\Delta RSSI|$) will typically be at its maximum, the average value (Avg(Rss1+Rss2+ ... )) will be relatively low and the NRss factor will be at a relative minimum. The NRss factor may thus be used as a normalized measure of confidence that a P/PAS transmitter is located in or centered within the fine resolution region. Or alternatively, it may indicate that a P/PAS transmitter is not located inside the fine resolution region In one embodiment the fine resolution region of interest has length and width dimensions on the order of two by one meter or less.

It is to be understood that above equation Eq. 1 is merely an example for showing how a normalized confidence factor can be generated. It is not necessary for the confidence factor to be normalized or for the antennas to be equally favored. A non-normalized confidence factor can be instead generated and used in accordance with the following equation Eq. 2:

$$nNRss = A - B * |D * Rss1 - (1 - D) * Rss2| + \frac{C}{\text{Avg}(Rss1 + Rss2)} \quad \text{Eq. (2)}$$

where A, B and C are empirically picked constants (C is a negative value) and D is a left versus right favoring factor in the range 0 to 1. When D=0.5, the reception strength values obtained from the corresponding antennas are equally favored. The D favoring factor can be programmatically varied to pick the portion of the antennas-covered region (e.g., the center portion) where weighted strengths substantially equalize. Thus, even if the co-located antennas are fixedly mounted, the spot in the region of interest where the received and weighted signal strengths are to substantially match, and thus provide the maximum confidence level, can be programmatically shifted. Although normalization does not occur in equation Eq. 2, the non-normalized confidence factor (nNRss) increases as the favoritism-weighted difference value ($\Delta RSS$) approaches zero and/or as the average strength value (Avg(Rss1+Rss2+ ... )) increases. Conversely, the non-normalized confidence factor (nNRss) decreases as the favoritism-weighted difference value ($\Delta RSS$) increases above zero and/or as the average strength value (Avg(Rss1+Rss2+ ... )) decreases. The average strength value may also be generated using favoritism-weighted strength determinations (e.g., Avg(W1*Rss1+ W2*Rss2+ ... )). Appropriate threshold values can be picked empirically for determining if the non-normalized confidence factor (nNRss) provides a sufficient confidence level for respective contexts (e.g., times of day, level of background noise) for concluding that the PAS emitter is in or outside of the region of interest. In one embodiment, when the confidence factor is above a predetermined threshold level, a confidence-based action is taken, for example associating a unique patron identification provided within the patron-presence and patron-identifying advertising signal (P/PAS) with a placed order for goods and/or services while the detected P/PAS emitter is inside the fine resolution region of interest. In one embodiment, thresholds and weighting factors are determined based on over-time machined learned optimizations and historical data stored in a database. In one embodiment, the D favoring factor is programmatically swept over time over the range of 0 to 1 (or over one or more predetermined subsets of that range) so as to pinpoint the location of a P/PAS emitter in the swept region of interest.

Yet more generally, the generating of the confidence signal may take on the form of the following equation Eq. 3:

$$nNRss = A - B * |D * Rss1 - (1 - D) * Rss2|^E - \frac{F}{(\text{Avg}(W1 * Rss1 + W2 * Rss2))^G} - H * \frac{|Rss1 - Rss2|}{\text{Avg}(Rss1 + Rss2)} \quad \text{Eq. (3)}$$

where A, B, E, F, G, H, W1, W2 are empirically picked constants and D is a left versus right favoring factor in the range 0 to 1. Power factor E is preferably greater than 1 to thereby accentuate the difference factor. Power factor G is also preferably greater than 1 to thereby accentuate the running average strength factor.

It should be noted here that the locating of users of personal mobile devices is known for relatively coarse levels of resolution. For example, cellular towers may be used to determine presence of cellular smartphones within respective telephone communication cells or as the users cross from one cell to the next (and invoke cellular handovers) or by means of proximity triangulation. In another example, the users' mobile devices use GPS satellite technology (a form of multilateration) to determine respective locations to a resolution of a few meters (e.g., 10's of meters) and to then broadcast this location information. However, for finer levels of resolution based on short range broadcasts, supporting technologies are limited. In particular, if a P/PAS signal is relatively weak because the battery in the P/PAS transmitter is low or the P/PAS is disposed within a broadcast attenuating environment such as behind a metallic object, it becomes difficult to distinguish that P/PAS from competing background noise or interference by other nearby P/PAS transmitters. It has been found that the use of the plural co-located directional antennas with partly overlapping and relatively narrow reception sensitivity lobes (e.g., primary forward lobes) in combination with determination of when the received signal strengths for the favoritism-weighted plural antennas null out ($\Delta RSS=0$) works well for determining presence within the narrow region of overlap, with a relatively high level of confidence, of an attenuated P/PAS emitter even in the presence of background radio noise and/or competing nearby other transmitters.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the present teachings. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

More specifically, when the term "P/PAS" (Patron-presence and Patron-identification Advertising Signal) or its equivalent "P/PA-signal" is used herein, it is to be construed broadly unless otherwise specified as encompassing any repeatedly broadcast radio signal that can be detected as specifically indicating presence of its emitter in a relevant finite area and uniquely identifying the emitter. A repeatedly broadcast Bluetooth beacon can qualify as a P/PAS. An Ultra-wideband (also known as UWB) radio transmission can be used. Repeatedly broadcast beacons of other types of radio protocols including spectrum hopping ones can qualify as a P/PAS's. A repeatedly broadcast Wi-Fi signal can qualify as a P/PAS. The repeated broadcasting of the P/PAS can be due to built functions of the utilized operating system in the associated mobile device or due to specially installed programs, applications or services (including background peripheral services of BPS's). The P/PAS may contain an identification that uniquely identifies its mobile device and/or uniquely identifies its user and/or uniquely identifies a specific request for corresponding goods and/or services.

FIG. 1A illustrates a first exemplary environment (e.g., a sit-down restaurant) 100 which can support a number of different online pre-ordering and in-person ordering schemes in accordance with the present disclosure. The schematic illustration depicts the venue 100 as having venue-controlled or venue-monitorable areas covered by respective wireless scanning devices 127 of coarse, moderate and fine resolution radio signal detection capabilities. (In one embodiment, coarse resolution may be construed as encompassing an area of no more than a handful of meters in diameter while fine resolution may be construed as encompassing an area of no more than a fraction of a meters in diameter.) In the illustrated example, a first or primary patron 110 enters a welcoming area of the restaurant 100 as a single customer or with companions (a.k.a. related other patrons—not shown) seeking seating in a specific type of area, for example a main dining area (e.g., 132). A restaurant receptionist 140 may be immediately available in the welcoming area or alternatively, the primary patron 110 and optional companions may have to wait around until one appears. The receptionist 140 (who is representative of more generic and sporadically-available staff members at the provider's premises) will typically inquire about the identity of the primary patron (and optionally of his/her companions—not shown—for example his/her related family members). The receptionist 140 will also typically inquire about expectations of the primary patron. In one embodiment, the specific identity of the primary patron and optional further companions may have been pre-established online using web services (and/or other software processes—not shown in the figure) associated with the provider's venue 100. In one embodiment, the web services or other software processes may additionally pre-establish a logical link between a mobile communication device (e.g., smartphone, smart watch, tablet, etc.) carried by the primary patron, the identity of that patron and a reservation made by that patron for restaurant seating and services.

The receptionist 140 may ask the patron and companions to specify his/their dining preferences and/or requirements if those were not previously established or appear to require revision. Such preference/requirement specifications may include indicating the number of guests to be accommodated, the types of patrons (e.g., toddlers, older children, adults, disabled, etc.), the types of seats/tables that are acceptable (e.g., booth, round table versus rectangular table, types of seats (tall, low, with arm rests, for small child, space for wheel chair etc.), the desired ambiance (e.g., outdoor, indoor, nonsmoking, at bar, etc.) and so on. In one embodiment, some or all of this information may have been pre-collected by online web services associated with the restaurant 100. If a currently desired option is not immediately available (e.g., round table seating 132 for six patrons), the patrons may be directed to one or more waiting areas (e.g., an alcohol-serving bar 133, an arcade game or other entertainment-providing room 134, an appetizers providing small tables area—not shown, etc.) where he/they can wait and at the same time optionally order some small pre-meal items (e.g., alcoholic or other drinks, bread/butter and appetizers) and/or otherwise begin incurring charges.

In one embodiment, when the identity of the primary patron 110 is obtained by the receptionist 140 or is otherwise obtained (e.g., automatically obtained based on a previously created logical linkage between the identity of the patron and a unique signature of that patron's P/PAS emitting device), if not already done, that identity is logically linked to a first P/PAS emitting device 115 that is to be carried and/or worn by the patron while he is within the restaurant's premises (provider's premises). The P/PAS emitting device 115 repeatedly broadcasts a Patron-presence and Patron-identifying Advertising radio Signal (P/PAS) uniquely associated with the identified patron. At least some of the on-premise scanners 127 are configured to detect presence of the patron 110 within specific areas scanned by the scanners and to specifically identify the patron and/or his P/PAS emitting device 115 when in the specifically scanned area and to identify the time when detected in those areas. In one embodiment, the P/PAS emitting device 115 is a smartphone or smartwatch carried or worn by the associated patron 110. The smartphone and/or a smartwatch repeatedly broadcast a presence advertising signal such as a Bluetooth beacon signal in which or along with which a unique identification of the P/PAS emitting device 115 is provided.

In one embodiment, related companions of the primary patron (companions not shown) each also arrive with a respective smartphone and/or smartwatch which can serve as a P/PAS emitting device for the respective companion. In the same or an alternate embodiment, wristband devices or otherwise wearable devices (e.g., clip-on devices) are handed out to the primary patron and/or to his companions (e.g., to children who do not have their own smartphone or smartwatch) and these handed out devices serve as P/PAS emitting devices for the respective companions. In one embodiment, the primary patron 110 agrees verbally or by way of an electronically formed contract to be responsible for all non-reversible charges incurred at the premises by himself and his/her related companions (companions not shown). It is to be understood that some of the incurred charges are reversible ones while others are not. One example of a reversible incurred charge is when a food item is ordered from a waitress but not delivered or consumed for any of a variety of legitimate reasons: out of stock, lost order, badly cooked, etc.). Another example of a reversible incurred charge is when a patron removes a purchasable item from a self-serve shelf (or other item support) but later decides to put it back and not keep the purchasable item.

Assuming the primary patron 110 and some of his optional adult companions elect to begin nibbling on some food or consuming some drinks in the restaurant welcoming area while some of the other adults and their children run off to be entertained in a small and adjacent arcade game or other entertainment-providing room (134, not shown), a first staff member (e.g., the receptionist 140) may handle the first set of orders optionally placed by the incoming patrons in the front area. In doing so, and in accordance with the present disclosure, the first staff member does not have to learn the specific identifications of the served patrons (P/PAS emitters possessing patrons) or settle bills with them then and there. That an be handles when the consolidated bill is automatically generated at the end of the patrons' stay. Next, if or when some or all of the adult patrons move to a subsequent queuing area (e.g., the bar 133), a second staff member (e.g., bartender, floating waitress, also referenced herein as 140) may handle a secondary set of orders placed by the at-bar patrons. The second staff member similarly does not have to determine the specific identities of the patrons and instead my merely note which bar stool they sat at or stood nearby. Charges incurred by the respective patrons in each of the specific service-providing areas of the restaurant 100 (e.g., 133, 134) will be automatically added to a growing tab 114 associated with each respective patron. In one embodiment, each respective patron has his or her own individual tab of incurred charges and additionally some or all of the individual tabs may be grouped to form a group tab for interrelated patrons which group tab the primary patron or another patron may later pay for.

At a subsequent time, when the arrived patrons (110 plus optional others) move to their desired main dining location (e.g., indoor table 132 for six), a third staff member (e.g., waitress dedicated to that dining section, also designated herein as 140) may handle the major set of orders (e.g., full course meals) placed by the customers. Optionally, the customers may subsequently ask to move to an outdoor seating area 131 for desserts, after-meal drinks, smoking and so on where a fourth staff member (e.g., outside servicing waitress, also 140) may handle their correspondingly placed orders.

As indicated at 114 in FIG. 1A, a logical link 112 is established between each individual patron (participating patron, e.g., primary patron 110) and his or her charge-incurring activities while within the provider's premises. The charge-incurring activities may include those 114a transacted while at the restaurant's bar area 133 for drinks, food items and tips issued to bartenders or other staff members 140 interacted with there. Further of the charge-incurring activities may include those 114b transacted while in the restaurant's outdoor seating area 131. Yet further of the charge-incurring activities may include those 114c transacted while seated at specific seat locations around the requested indoor table 132. In some embodiments, one or more of the patrons may incur yet further after-meal extra charges in other restaurant areas, for example by returning to the bar area 133. The present disclosure also contemplates that each individual tab may include yet further individually-incur charges 114e such as through the use of entertainment providing devices or services in the arcade or other entertainment-providing room 134.

As further indicated in FIG. 1A, a local or remotely located computer server 120 may keep track and compile and store the list of individually incurred charges of each patron in his or her respective tab 114. Typically, the tab 114 will not only include the individually incurred charges but also details such as the specific times and specific areas within the provider's premises 100 (for example as based on a pre-established two or three dimensional reference frame 105) of when and where the charges were incurred and optionally with which staff member 140 or by way of an automated device (not shown, could be in room 134) the charges were incurred.

While in the provider's premises 100, the primary patron 110 and/or his companions may discover that they cannot always gain the attention of a provider staff member 140 immediately when interaction with the staff member is desired. The staff member 140 (e.g., front area receptionist, bartender, waitress, manager, etc.) may be busy attending to needs of other patrons or the respective staff member may be in a different room or not at the moment looking in the direction of an attention seeking patron. No matter what the reason, quite often significant time may be consumed in getting the attention of a staff member 140 who can help, waiting for them to come over, communicating the patron's desires (and identities) to that staff member and then waiting for the staff member to provide the desired services (e.g., providing a final bill for incurred charges). There are cases when one or more charge-incurring patrons at the establishment 100 do not wish to wait or cannot wait (e.g., due to an unexpected emergency). The present disclosure enables such patrons to pay for their incurred charges up to that moment and immediately leave without need for interacting with a member 140 of the staff of the provider 100 of consumed/taken goods/services.

More specifically, in a conventional restaurant (not 100), when customers complete their order placing activities (charges accruing activities) and their consumption of the various items (or packing some to take home), they need to ask a staff member for the tallied-up total bill and then pay it with the assistance of the staff member (e.g., waitress, cash register attendant) before they can leave. Sometimes they desire that this last set of actions be performed in a hurry because they have a developing emergency or a near term next appointment to reach (e.g., a theater performance beginning in half an hour and for which they already purchased tickets). At this point, in a conventional environment; an available staff member 140 who may not be immediately in sight has to be summoned for the task and has to be told about the time pressure. Then, all the order slips from the various order-takers (e.g., bartender, outdoor waitress etc.) and/or order-receiving locations have to be found and accumulated for the group or for individual subsets of the customers. The order slips have to be sorted, totaled, listed on a print out, and the listing has to be returned to the respective payment-handling customers for their review, approval and payment. Then when review is finished, the same or a further available staff member 140 (who again may not be immediately in sight) has to be summoned for picking up the credit cards, gift cards and/or cash, picking up the approved bill slips, running them through the establishment's financial processing system (e.g., cash register) and returning the finalized payment documents (and optional change) to the respective customers. If the customers are made to wait too long and/or if their orders get mixed up with those of others, they may become discouraged and not return to the establishment in the future.

Figure 1B:
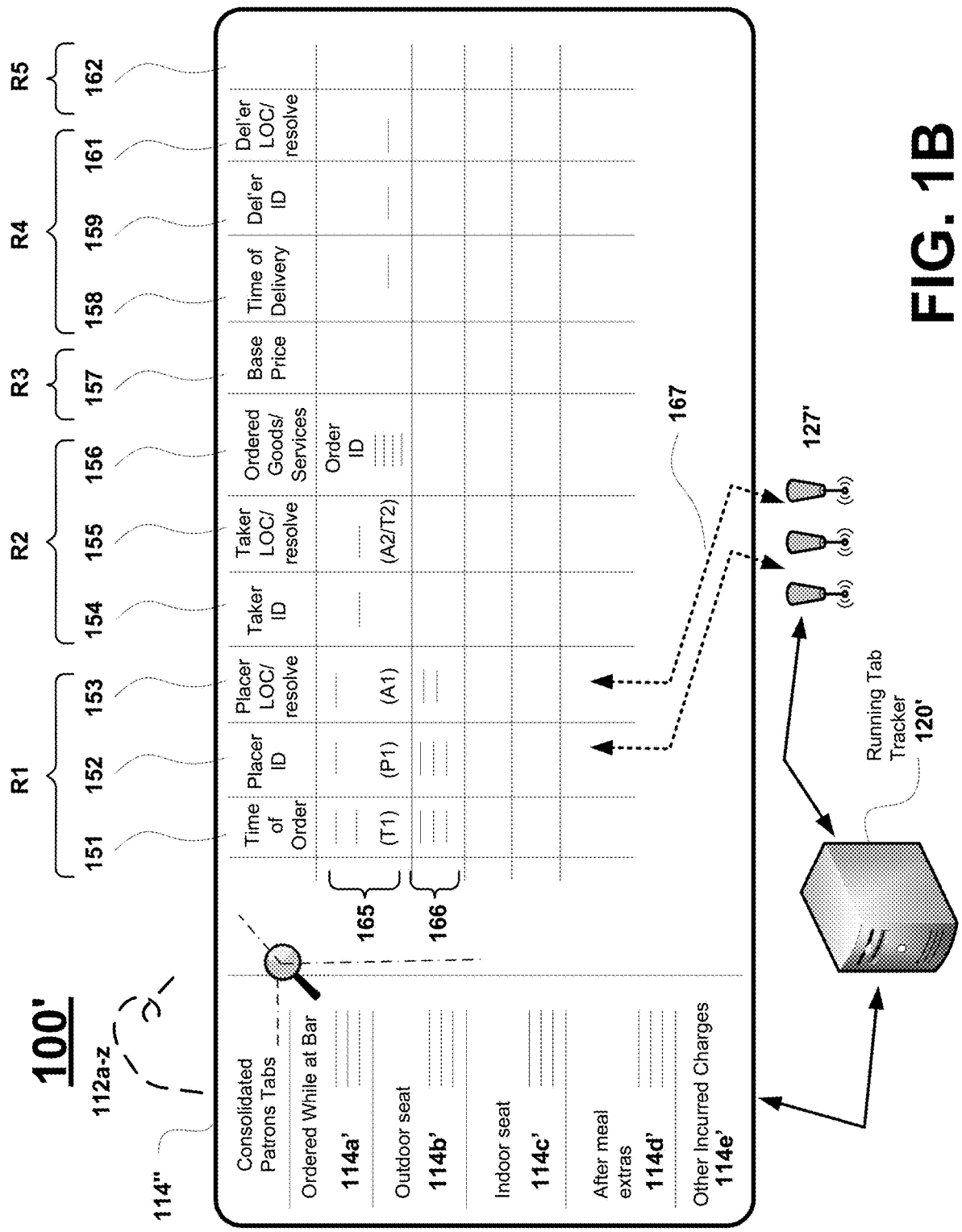
FIG. 1B is a schematic diagram of a data structure for automatically consolidating accumulated charges for a customer or group of customers even though the latter may have moved from one on-premise location to another and/or placed orders (or engaged in other charge-accruing activities) with different attendants.

FIG. 1B illustrates a charges consolidating data structure 114" that can be automatically generated in accordance with the present disclosure from the individual tabs (e.g., 114 of primary patron 140 of FIG. 1A and unshown related companions) through the use of the patron-carried or worn P/PAS devices 115 and use of fine resolution scanners 127 that can detect the presence of such P/PAS devices and isolate the location of one of them to a specific area of interest while also directly or indirectly identifying the patron who is carrying a respective one or more of the P/PAS devices 115. First records R1 are automatically repeatedly generated (e.g., periodically over time) to record respective first times 151 (T1's) when presence of a P/PAS emitting device is detected in corresponding specific areas 153 (A1's) and to record a corresponding identity 152 of the charge incurring patron (e.g., first patron, P1) or to identity of the detected P/PAS emitter. An initially separate second record R2 is automatically generated to record a second time T2 (as part of item 155) when a charge-incurring activity is recognized as taking place and to record identity of second area (A2—shown as part of item 155)) at which the recognized charge-incurring activity is recognized as taking place (e.g., the ordering of a food item at seat number 3 of the lunch counter at approximately 12:15 PM—the order taker does not need to know the specific identity of the order placer). Although FIG. 1B implies that there is a one-to-one correlation between R1 records and R2 records, that is generally not true. More typically the rate of production of R1 records will be substantially greater than that of R2 records. This is done to assure that there will always be at least one R1 record to match up with each R2 record. The rate of production of R1 records will depend on a number of factors such as context, P/PAS emitting rate of the emitting devices and scan rate of the involved scanning devices. When more than one R1 record matches up with a given R2 record, any of a variety of combining functions may be used to determine which one or more of the R1 records should be combined with the R2 record. For example, a median one of the matching R1 records may be picked, or an average of presence positions and presence times may be used. The plural matching R1 records may define a travel trajectory over time taken by the respective patron. Pre-trained AI software may be used to determine if a given trajectory reasonably matches up with data in a corresponding R2 record. Chronological proximity of one or more of the recorded T1 times with the order time T2 and spatial proximity of one of the recorded A1 patron presence locations with the area A2 where the charge-incurring activity is recognized are may be used to combine substantially matching ones (based on context) of the first and second records, R1 and R2, with one another and thereby associate a specific patron (e.g., P1) with the recognized charge-incurring activity (e.g., order taken at seat number 3 of the lunch counter). The order taker does not necessarily have to know the specific identity of the order-placing patron (e.g., P1).

As will become more apparent below, a variety of different mechanisms may be used to recognize that a potential charge-incurring activity is taking place. In one embodiment, a provider staff member 140 (identified by data item 154 of record R2) records a time and location of a taken order. The order-taker's recordation of patron location may take the form of a combination of a seat number at a given table number. Simultaneous location of a Taker's P/PAS device carried by the order-taker 140 may be used in generating the R2 record. This information 155 is provided in the second automatically created record R2 together with details (characteristics) 156 of the taken order. Later, the second record R2 is automatically matched up with a substantially similar one or more of the first records R1 due to context-based substantial proximity of time and place as between the matched together R1 and R2 records. More to the point, an order-receiving staff member 140 (e.g., a floating waitress, a bartender, etc.) may not know the full identity of an order-giving patron and instead may only know that the specific patron is sitting in the Northeast seat of an identifiable table (say 132 of FIG. 1A). However, one of the finer-area resolving scanners 127 of the premises 100 may automatically detect the contemporaneously isolated presence of the patron's P/PAS device(s) 115 as being substantially proximate to the location (155) recorded by the order-receiving staff member 140 so that the identity of the charge-incurring patron (e.g., 110) as specified in one of the periodically recorded first records R1 may be automatically matched up with the ordering information stored in the second record R2. What constitutes substantial proximity in terms of time and location may vary from one kind of provider premise to another and even from one portion of a given premise to another. It is context based. In one embodiment, substantial proximity in terms of time and location is established by way of fixed rules provided by vendor. In the same or an alternate embodiment, substantial proximity in terms of time and location is established by way of variable rules stored in and computed according to current context in a knowledge database and/or established by way of a pre-trained artificial intelligence system (e.g., trained by provider staff posing as customers under different contexts). For example, if there are a relatively large number of R1 records for likely matchup with a single R2 record, the large number of R1 records may enable pre-trained AI software to infer travel trajectories and rates of travel for passing by P/PAS emitting devices. One may have passed through at a speed that makes it unlikely that its possessor engaged in a charge-incurring activity while another may have paused at a spot sufficiently long to make it reasonable to conclude that its possessor did engage in a charge-incurring activity at the location where the activity was recognized and during a time substantially proximate to the time of recognition.

Additional, relevant and further records may be matched up with the combination of the matched together R2 record and the one or more correlated thereto R1 records. For example, base prices (e.g., reversibly incurred charges) for the then-and-there ordered items 156 may be recorded in column 157 of a third record R3. In one embodiment, the recorded base prices 157 may be subject to various discounts if the patron has an associated discount coupon or other basis for price reduction (e.g., membership in a specific organization)—see above cited and here incorporated by reference application Ser. No. 16/783,087 filed Feb. 5, 2020. Although not shown, such price modifying information may be further automatically recorded in the third record R3. In one embodiment, a fourth record R4 is automatically co-associated with the first through third records, R1-R3. This fourth record R4 indicates the time (158) when the ordered items are delivered to the corresponding patron (P1), the identification (159) of the order delivering staff member 140 and the location (161) of the order delivering staff member, where the identification and location of the order delivering staff member may be automatically determined and recorded using one or more Deliverer's P/PAS devices (not shown) possessed by the order delivering staff member 140. In one embodiment, if the ordered items (156) are not timely delivered (as indicated by item 158) or the patron rejects the delivered items as being not acceptable (e.g., badly cooked), the associated incurred charges of the third record R3 are canceled or otherwise modified or revoked as may be appropriate in accordance with rules of the establishment 100. Yet further or alternate records (e.g., R5, 162) may be concatenated to the first through third records, R1-R3 depending on context. A restaurant environment in which human staff members (e.g., waitresses) take orders or orders are placed through automated terminals is merely an example. More generally, when a P/PAS emitter possessing patron who is in or on the monitored premises of a provider of goods/services engages in detectable activities that are recognized as being potential, charge incurring activities (e.g., removing an on sale item off a shelf or other support, placing a food order, playing an arcade game), the time and location of the recognition of the activity (T2, A2) and characteristic details about the recognized activity are recorded (e.g., in an R2 record). Locations of the P/PAS emitting device carried (e.g., worn) by the patron over time are also recorded at respective times (T1's in respective R1 records that also indicate the respective A1 locations). Substantial coincidence in time as well as location of an isolated patron's P/PAS emitting device with the location at which a potential, charge incurring activity has been detected and recognized as a charge-incurring activity is determined (e.g., using pre-trained AI software and/or context-appropriate expert knowledge base rules) and the so-determined as similar records (e.g., R1's and correlated thereto R2 record) are merged and added into an expandable list of potential, charge incurring activities linked to the specific patron who carries the P/PAS emitting device. A listing of incurred charges is thus created and can be paid for without involving a staff member on pay-go-whenever-ready (PGWeR) basis as shall be detailed below.

Still referring to FIG. 1B, in one embodiment, the expandable tabs of related plural patrons who belong to a group (e.g., a family, a group of dining together friends, etc.) are consolidated into a divisible group record 114". Linkages 112a through 112z represent back pointers to the individual tabs of the individual patrons. Although not shown, each individual tab may include forward pointers to the group record 114" as a whole or to specific portions therein. The divisible group record 114" may be partitioned into subgroups (e.g., 165, 166) of patrons and/or activities. More specifically, one subgroup may be composed of children 17 years old or under and another of adults 18 years old or above. The partitioned subgroups may additionally or alternatively represent patrons who may or have to leave early and other patrons responsible for paying their incurred bills. Data fields for each subgroup may identify the patron in that subgroup who placed an order (or engaged in another charge-incurring activity), the time the activity took place, the location of detection or recognition of the charge-incurring activity, the location of the P/PAS emitting device at substantially the same time and the identity of the P/PAS emitting device and/or of its possessor. Dashed lines 167 represent the automated detecting of the P/PAS emitting device at specific locations (fine resolution regions of interest, A1's) and times (T1's) as well as identifying the specific patron (P1) associated with the P/PAS emitting device 115. This done with use of one or more of fine, medium or coarse resolution P/PAS detecting scanners 127' as situations permit (see also FIG. 1C). Signals representing the various detections of emitter presence over time and across space as well as signals representing the various recognitions of charge-incurring activities at corresponding locations and times (A2's, T2's) are transmitted to tabs tracking server 120' for consolidation into building the divisible group record 114".

Figure 1C:
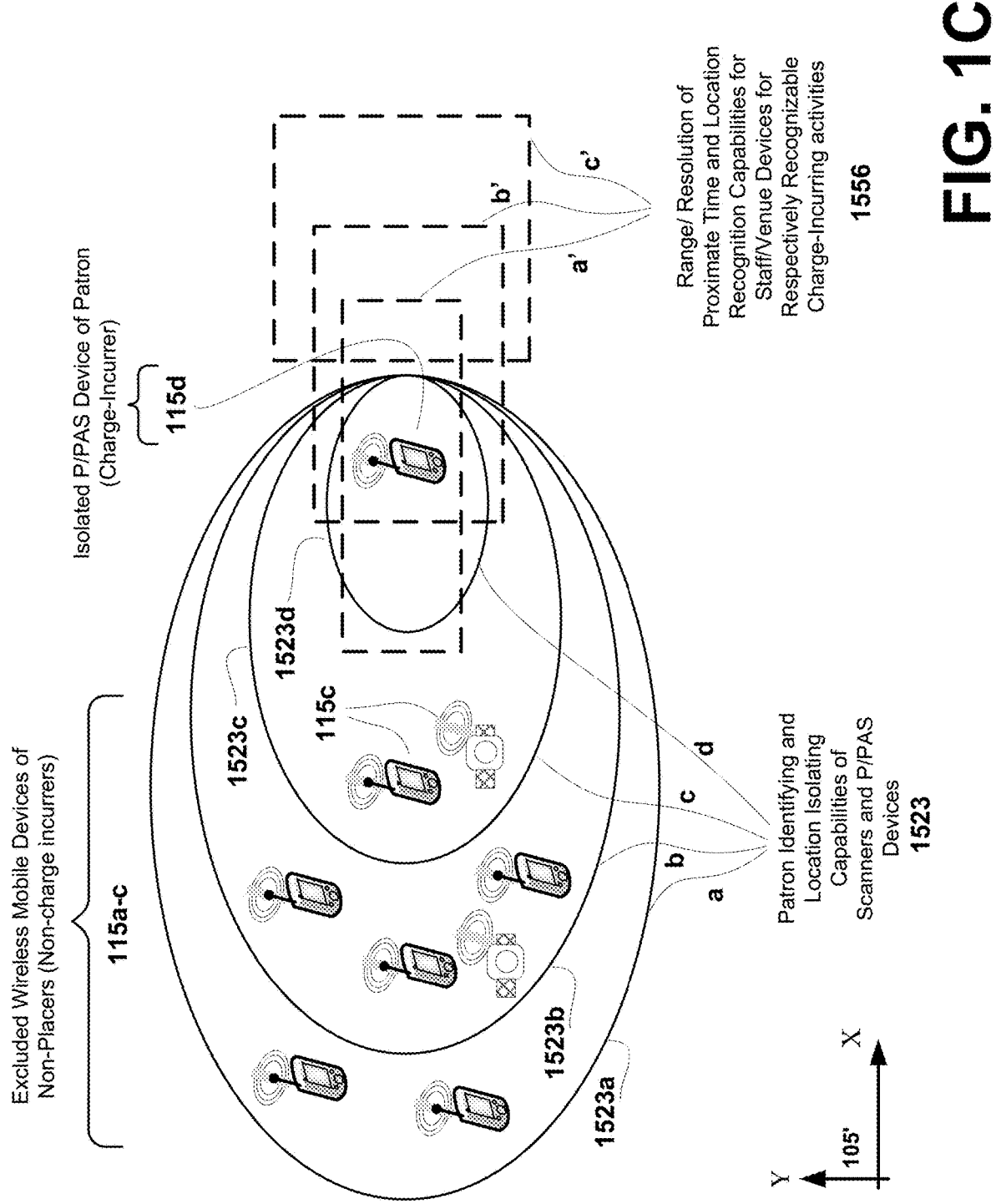
FIG. 1C is a schematic diagram illustrating the concept of determining place and time overlap between an isolated presence-detecting and identity advertising radio signal transmitter (P/PAS emitter) of a specific order-placer (or otherwise charge-incurring individual) and substantially cotemporaneous detection and recording of the order placement or other charge-incurring activity.

Referring to FIG. 1C, the concept of matching up detections of P/PAS emitting device presence in specific locations and times (A1's, T1's) with detections of recognized charge incurring activities at corresponding locations and times (A2's, T2's) is illustrated schematically by way of a top plan view of an XY plane floor plan. Elliptical boundaries 1523a through 1523d represent exemplary ranges and resolving coarseness's of respective P/PAS detecting scanners. More specifically, elliptical boundary 1523a is the range and resolution capability of the coarsest of the P/PAS detecting scanners (not shown) in the illustrative example. Elliptical boundary 1523b corresponds to the second coarsest of the P/PAS detecting scanners. Elliptical boundary 1523d is the range and resolution capability of the finest resolving one of the exemplary and hypothetical P/PAS detecting scanners. Elliptical boundary 1523c corresponds to the second finest resolving ones of the P/PAS detecting scanners. The scanners need not be co-located or pointed in the same direction. Relatively orthogonal scan vectors may be swept over time to intersect at different locations. (See briefly FIG. 2B.) In one embodiment, the finest resolving one of the exemplary and hypothetical P/PAS detecting scanners uses the plural directional antennas technology of here-incorporated by reference U.S. patent application Ser. No. 16/725,262 entitled "High Confidence Isolated Presence Detection In Fine Resolution Region".

In the illustrated and hypothetical example of FIG. 1C, only one P/PAS emitting device 115d is disposed within the range/resolution boundary 1523d of the finest resolution scanner. Three P/PAS emitting devices, 115c (two of them) and 115d are disposed within the range/resolution boundary 1523c of the next finest resolution scanner. A total of seven P/PAS emitting devices, including 115c and 115d, are disposed within the range/resolution boundary 1523b of the second coarse one among the coarser scanners. A total of nine P/PAS emitting devices are disposed within the range/resolution boundary 1523a of the coarsest scanner.

In contrast to the elliptical shaped boundaries 1523a through 1523d, dashed rectangular boundaries 1556a' through 1556d' represent exemplary ranges and resolving coarseness's of respective hypothetical recognizers, detectors and/or reporters of recognizable charge-incurring activities. More specifically, rectangular boundary 1556a' defines the range/resolution of a first recognizer, detector and/or reporter of a first kind of recognizable charge-incurring activities (e.g., removal of an on-sale item from a specific shelf area—see 1556' of FIG. 1D). If a charge-incurring activity is detected and/or reported by the detector/reporter of boundary 1556a' and, for substantially the same time, isolated presence of P/PAS emitting device 115d is detected and reported by the fine resolution scanner of elliptical boundary 1523d then a determination can be automatically made (by way of one or more digital signal processors using AI software and/or expert rules) that the reported (and recorded in a respective R2 record) charge-incurring activity is to be associated with the possessor (patron) of P/PAS emitting device 115d. Because they are outside the overlapping detection ranges and areas of elliptical boundary 1523d and of rectangular boundary 1556a', all other P/PAS emitting devices 115a-c are logically excluded as being those of patrons who could have probably carried out the charge-incurring activity detected and/or reported by the detector/reporter of boundary 1556a'. In one embodiment, rather than requiring 100% absolute certainty in determining that a single P/PAS emitting device is inside an overlap of a respective elliptical boundary 1523 and a respective rectangular boundary 1556, the software allows for a few P/PAS emitting devices to be inside the overlap and then uses artificial intelligence (AI) which has been trained to know propensities of the associated patrons for determining which of the few possible charge-incurring patrons was the one that most likely incurred (e.g., greater than 50% likelihood) the detected or reported charge-incurring activity. The identity of that one software-determined as most likely patron is recorded as having been the one who specifically engaged in the recognized charge-incurring activity. More specifically and briefly for the example of FIG. 1D (detailed below), if illustrated adult shopper 110a has a child next to her (not shown) and that child has a respective P/PAS emitting device (e.g., her own smartphone), pre-trained AI software can determine that the possessor's of the detected plural P/PAS emitters are related to one another and that more likely than not, the older one of the related patrons will be paying for the removed item and thus it is appropriate to add the removed item to the older patron's tab. In one embodiment, if the child (not shown) runs off to another aisle and removes a bag of cookies there and then returns to the side adult patron 110a for dropping it into the cart, the child's charge-incurring activity will be automatically recognized as being related to the adult 110a and the incurred charge will be automatically added to the consolidated group tab to be paid for by the adult 110a.

Rectangular boundary 1556d' in FIG. 1C represents an exemplary range and resolving coarseness of respective hypothetical recognizers, detectors and/or reporters of charge-incurring activities in an area that is not covered by the finest to coarsest of the respective scanners that cover respective areas 1523a through 1523d. A different scanner would have to be provided to overlap with rectangular boundary 1556c' for identifying the patrons who are present there when respective charge-incurring activities are recognized as having taken place in rectangular boundary 1556c'. The hypothetical recognizers, detectors and/or reporters of charge-incurring activities taking place in the corresponding and schematically represented rectangular bounded areas could be human and/or automated machines. For example, a human waitress can recognize a verbal order placement with her eyes and ears and then hand-record on a paper notepad or type into an order recording device, the table number, seat number from which, and the approximate time at which a corresponding order was taken without need for knowing the specific identification of the order-placer. The hand recorded report is then converted (e.g., by optical character recognition technology) into a digital record that is formatted to serve as an R2 record (and as an R3 record if the base price is included), where the latter can provide details about the nature of the order beyond time and place. The identity of the order-placing patron is automatically determined from the P/PAS emitting device that a corresponding scanner 127 determines to be located substantially proximate to that table number and seat number at substantially the same time. (What constitutes a substantial spatial and chronological proximity can vary with context. In one embodiment, AI software is used and trained for determining what constitutes a substantially same time and location based on extant context such as time of day, day of week, crowding together of patrons, flow rate of patrons/orders through the establishment and so on.)

Referring again to FIG. 1D, shown is another environment 100' in which respective patrons (e.g., 110a, 110b) may wish acquire goods (e.g., off-the-shelf grocery or other items supported on support structures from which removal is detectable) on a grab-and pay-go-whenever-ready basis (PGWeR) without needing assistance of the provider's staff members and without having to wait on a checkout line for an available checkout scanner when ready to pay for the goods and immediately leave. Although not shown, in the same or an alternate embodiment the patrons can be acquiring services (e.g., entertainment from arcade games, medical services from online or on-premise health providers) by stopping at respective kiosks/stations basis and obtaining the corresponding services with charges accrued to their expandable pay-go whenever-ready tabs depending on which kiosks/stations they stop at and use. In accordance with the disclosure, the ordering or acquisition of a corresponding unit or units of goods/services (e.g., off-the-shelf grocery items) in a charge-incurring manner at a specific location (e.g., shelf 2 on supermarket aisle 12, 23 feet down the left side and the recognized activity not being for action carried out more than halfway of the aisle width away form the shelf) is recognized as having taken place at a respective place and time (A2, T2) due to being detected and/or reported by a first mechanism (e.g., 1556') while the isolated presence and specific identification of a patron in a substantially same location and at a substantially same time (A1, T1) is automatically detected by a P/PAS emitter(s) detecting, second mechanism (e.g., area specific P/PAS scanner/detectors 127n' and 127n"). In one embodiment, the P/PAS emitter(s) detecting, second mechanism uses plural directional antennas as disclosed in the here-incorporated by reference U.S. patent application Ser. No. 16/725,262 entitled "High Confidence Isolated Presence Detection In Fine Resolution Region" while optionally sweeping its favoritism-weighted plural antennas null out line ($\Delta RSS=0$) 128 over time by changing the favoritism-weights (see for example above equation Eq. 2). A match or strong correlation between the time and place where identified goods/services were recognized as being ordered or acquired in a charge-incurring manner and the presence of a specific patron at substantially the same location and at a substantially same time as automatically detected by the P/PAS emitter(s) detecting, second mechanism (e.g., scanner/detector 127n' for patron 110a or scanner/detector 127n" for patron 110b in the background) is used to determine that it was that specific patron (e.g., 110a) who ordered or acquired the corresponding unit or units of goods/services in what is recognized as a charge-incurring manner. The incurred charge(s) and details about it (e.g., time, place, specification of the goods/services) is then added to that patron's expandable tab (e.g., 114).

Figure 1D:
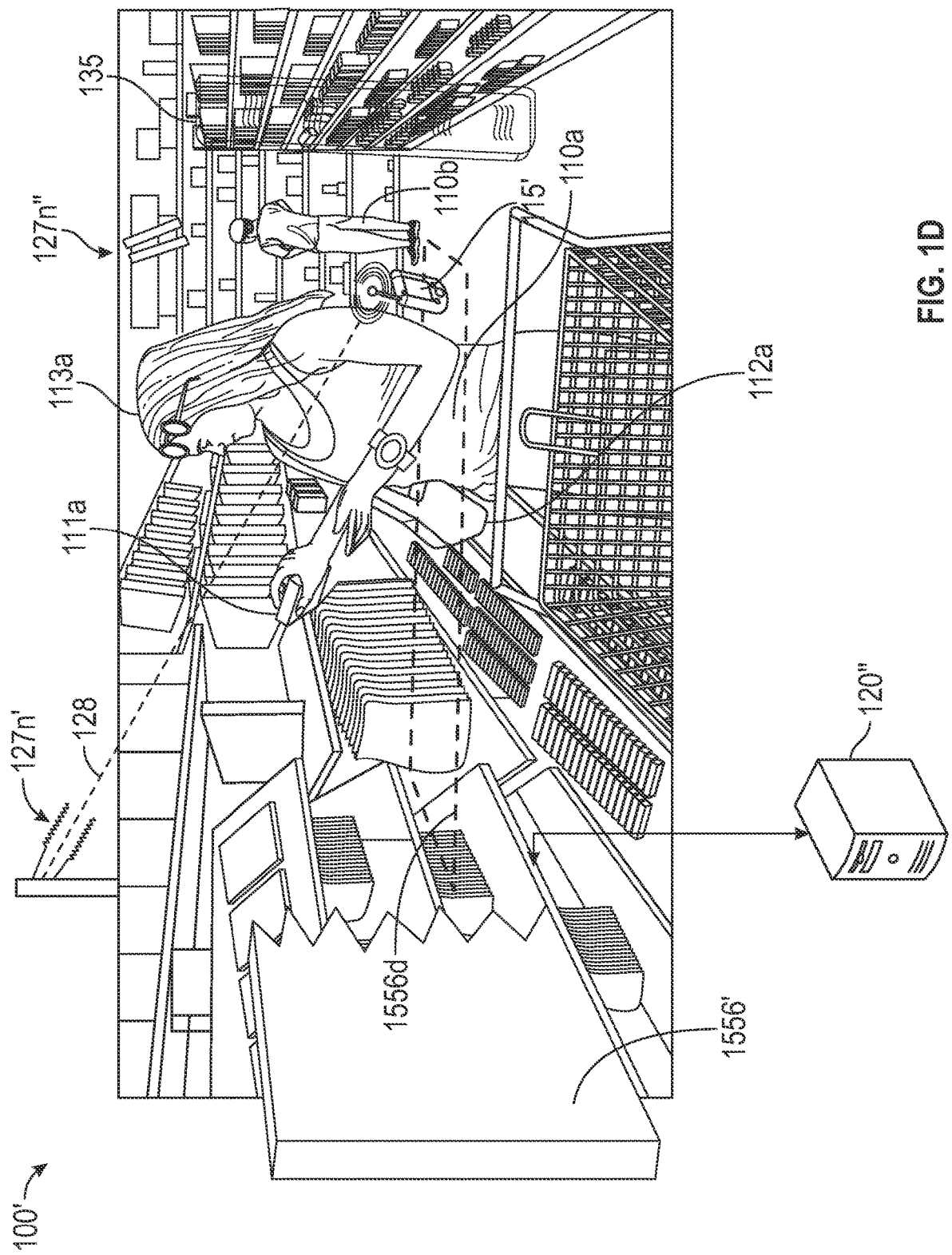
FIG. 1D is a schematic diagram of a second environment in which a charges-incurring individual moves through a provider's venue and performs charge-incurring activities at specific locations and times before departing on a pay-go-whenever-ready (PGWeR) basis.

As used herein, the terms, substantially same location and substantially same time can vary in scope based on context. For example, in the supermarket environment 100' depicted in FIG. 1D, removal of a specific item from a shelf area at a first time t1 may be automatically detected by a shelf monitoring mechanism 1556' that is sensitive to change of weight, and/or to change of item count for on shelf-units or otherwise. In one embodiment, the removable items may have respective RFID identification tags attached to them while the shelves are equipped with near field radio scanners that can detect when a specific item is no longer on the shelf because it has disappeared from the current on-shelf inventory list as detected by a corresponding near field radio scanner. If the customer does not return the item back to the shelf within a pre-specified time duration t2 after removal time t1, the shelf monitoring mechanism 1556' can report that the item has been taken in what is recognized as a charge-incurring manner associated with recognition extent area 1556d. (The size of the recognition extent area 1556d can vary with context. For example, for some items, purposeful removal might require that the patron stand very close to the shelf while for other items purposeful removal might require that the patron stand a predetermined distance away from the shelf or other relevant support structure.) On the other hand, if the item is returned to the shelf within the pre-specified time duration t2, the shelf monitoring mechanism 1556' will not report that the item as having been taken in a recognized charge-incurring manner (or alternatively will issue a revocation of an earlier output R2 record reporting the initial removal activity). The pre-specified time duration t2 can vary from one shelf area to the next depending on the types of items and depending on other contextual factors (e.g., how crowded the shopping aisle is, how wide the aisle is, how the items are supported on their respective support structures). In one embodiment, artificial intelligence (AI) is trained and used for determining what time durations t2 to use in various contexts. The dimensions of the specific locations covered by the first and second mechanisms (e.g., 1556' and 127n') can also vary based on context. FIG. 1D shows a predetermined rectangular area 1556d (represented by dashed white/black boundary lines) as being a corresponding area (A2') associated with removal detection mechanism 1556' and within which second mechanism 127n' detects the P/PAS emitters (115') of patron 110a as being present. Some large sized items may call for larger location specifications while some smaller items may call for narrower location specifications. In some embodiments the store may install physical partitions (e.g., shelf access separation partition 135) that limit where and how many customers can reasonably stand in each area. That may aid the automated determining of which P/PAS emitting device is most likely situated in a respective charge-incurring disposition. In one embodiment, artificial intelligence (AI) is trained and used for determining what location dimensions are to be considered as substantially proximate (e.g., near or overlapping) in various contexts. The AI software can also be trained and used to determine for different contexts what level of correlation or match is needed to decide that an item should added to a patron's tab based on the time and place where identified goods/services were detected or reported as being ordered or acquired in a recognized charge-incurring manner and based on detection of the presence of a specific patron as being at substantially the same location and at a substantially same time as automatically detected by the P/PAS emitter(s) detecting, second mechanism (e.g., scanner/detector 127n').

As depicted in FIG. 1D, the use of the P/PAS emitter(s) detecting, second mechanism (e.g., scanner/detector 127n') enables the corresponding patron 110a to inspect purchasable (or orderable) items in a hands free manner 111a without having to at the same time manipulate her smartphone 115' (or equivalent device) for barcode scanning or other such activities. Use of the P/PAS emitter(s) detecting, second mechanism enables the corresponding patron 110a to easily add items to her cart without having to pull out and scan credit cards or the like 112a at a checkout counter or for each pulled item. Use of the P/PAS emitter(s) detecting, second mechanism is not dependent 113a on facial recognition technology. Thus if the patron 110a is wearing sun glasses or other eye covering things (e.g., long hair extending over eyes, baseball hat, regular glasses, religious garb, face mask—for example for medical reasons) or if the patron 110a is wearing cosmetic make up that changes her appearance or other things (e.g., nose and mouth covering breathing mask), the identity of the patron can nonetheless be accurately determined using a unique identification signal output by one or more of her P/PAS emitter devices (e.g., smartphone, smart watch, vendor provided wrist band device or clip on device). The information collected by the first and second mechanisms (e.g., 1556' and 127n') are relayed wirelessly or by cable to a server 120" which matches up the substantially similar R1 and R2 records and automatically updates the patron's (e.g., 110a's) expandable tab (e.g., 114) as she moves about the premises and engages in various charge-incurring activities (e.g., adding items to her shopping cart). She can stop at any time, pay for all the charges she had accrued to that point and leave without need for assistance from a member of the provider's staff (e.g., 140) or need to wait for a self-checkout scanner to become available. In one embodiment, at the time the patron decides to pay and go, those of the recorded R1 records (patron presence detections at times T1 and at locations A1) that have not been matched up with a corresponding charge-incurring activity recognition R2 record (activity recognized at time T2 for location A2) are automatically purged from the system's memory. Alternatively or additionally, those of the recorded R1 records that have not been matched up within a predetermined time window after the presence detection (T1) with a corresponding charge-incurring activity recognition R2 record are automatically purged from the system's memory.

Figure 2A:
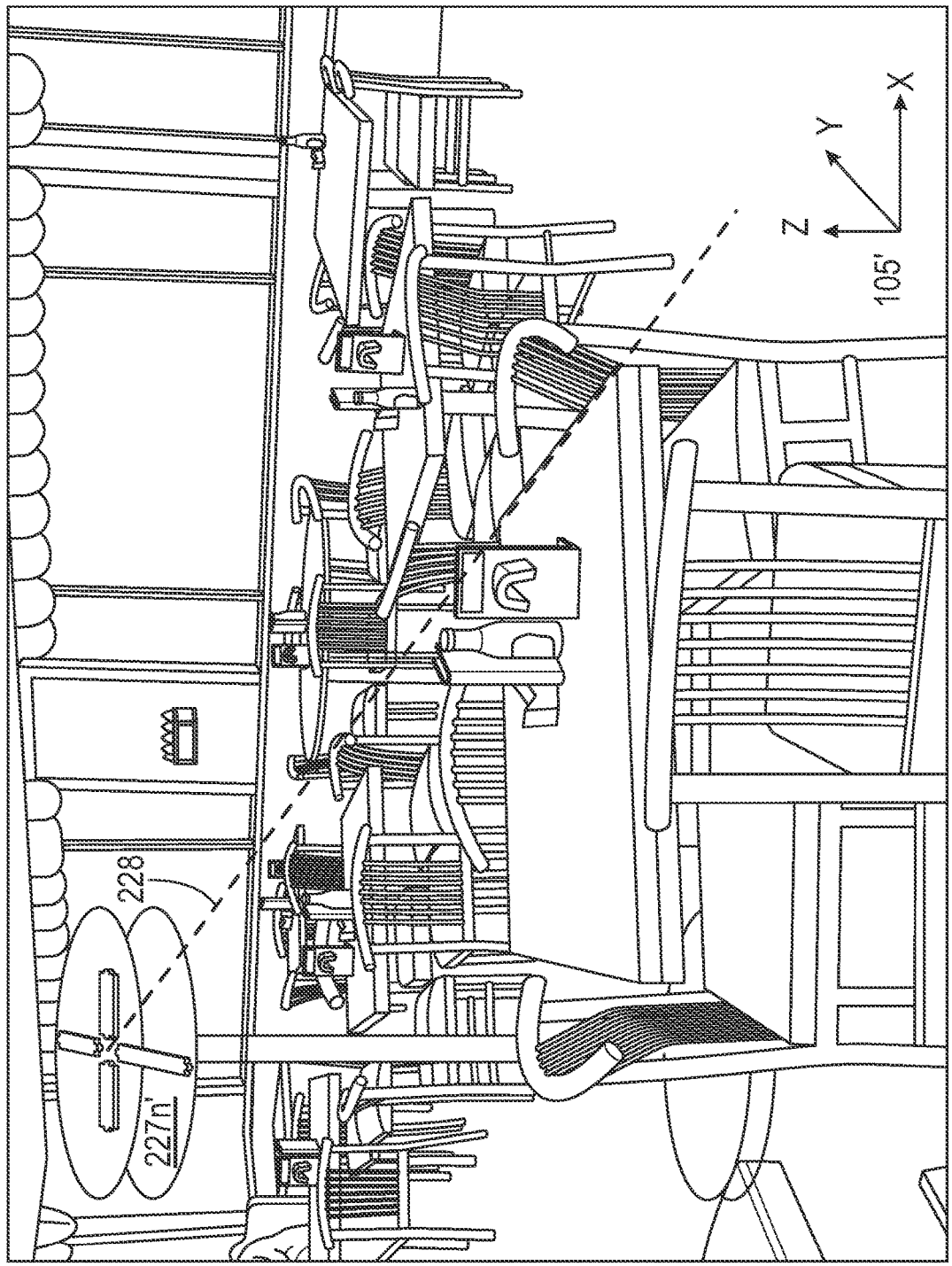
FIG. 2A illustrates a flexible third environment that includes a movable mechanism for identifying the specific locations of P/PAS emitters of respective charge-incurring individuals.

FIG. 2A illustrates how the system may be flexibly re-configured to accommodate rearrangement of seats, tables or other service providing elements in the provider's establishment 100". A restaurant may have movable tables and chairs which can be combined in different configurations to match seating requests made by respective groups of customers (e.g., seating for four, seating for six, etc.). In accordance with the present disclosure, movable and/or rotatable modules 227n' that contain P/PAS emitter detecting and identifying scanners within them are mounted above and around the tables so that scannable detection vectors 228 of the modules 227n' can be swept across seating locations around the tables for the purpose of isolating different charge-incurring individuals (not shown but understood to be seated in one or more of the illustrated chairs with at least some of the patrons wearing or carrying P/PAS emitting devices) as being present at specific locations and specific times.

In one embodiment, each scanners-containing module 227n' contains three or more directional antennas (four shown in the example at 90° apart as measured in the XY plane) hidden within a cylindrical or otherwise shaped RF-transparent container mounted on a movable and/or rotatable pole. Each directional antenna (e.g., Yaggi antenna) is operatively coupled to a respective radio receiver (not shown) that outputs a corresponding RSSI signal. Weighted difference detectors (also not shown) determine the angle of a swept-over-time weighted reception strengths matching vector 228 (ΔRSS=0) as between pairs of the radio receivers. One or more of these ΔRSS=0 vectors (e.g., 228) may be used to detect presence of and specific location of a P/PAS emitting device (e.g., 115). Further details may be found for example in the here-incorporated by reference U.S. patent application Ser. No. 16/725,262 entitled "High Confidence Isolated Presence Detection In Fine Resolution Region". Although not shown, plural ones of the P/PAS emitter detecting and identifying scanner modules (227n' being one of them) can be arranged and angularly oriented about the seating positions so that their respective ΔRSS=0 vectors (e.g., 228) may be swept over time to intersect at successive ones of the seating positions for thereby detecting isolated presence of a P/PAS emitter of a specific patron and identity of that specific patron at a specific seating position and at specific times. That information is subsequently matched with order slips from various order-takers (e.g., waitresses) indicating what items were ordered when from which specific seating position. The matched together information is used to construct the expandable tabs (e.g., 114) of the respective patrons (e.g., 110).

Figure 2B:
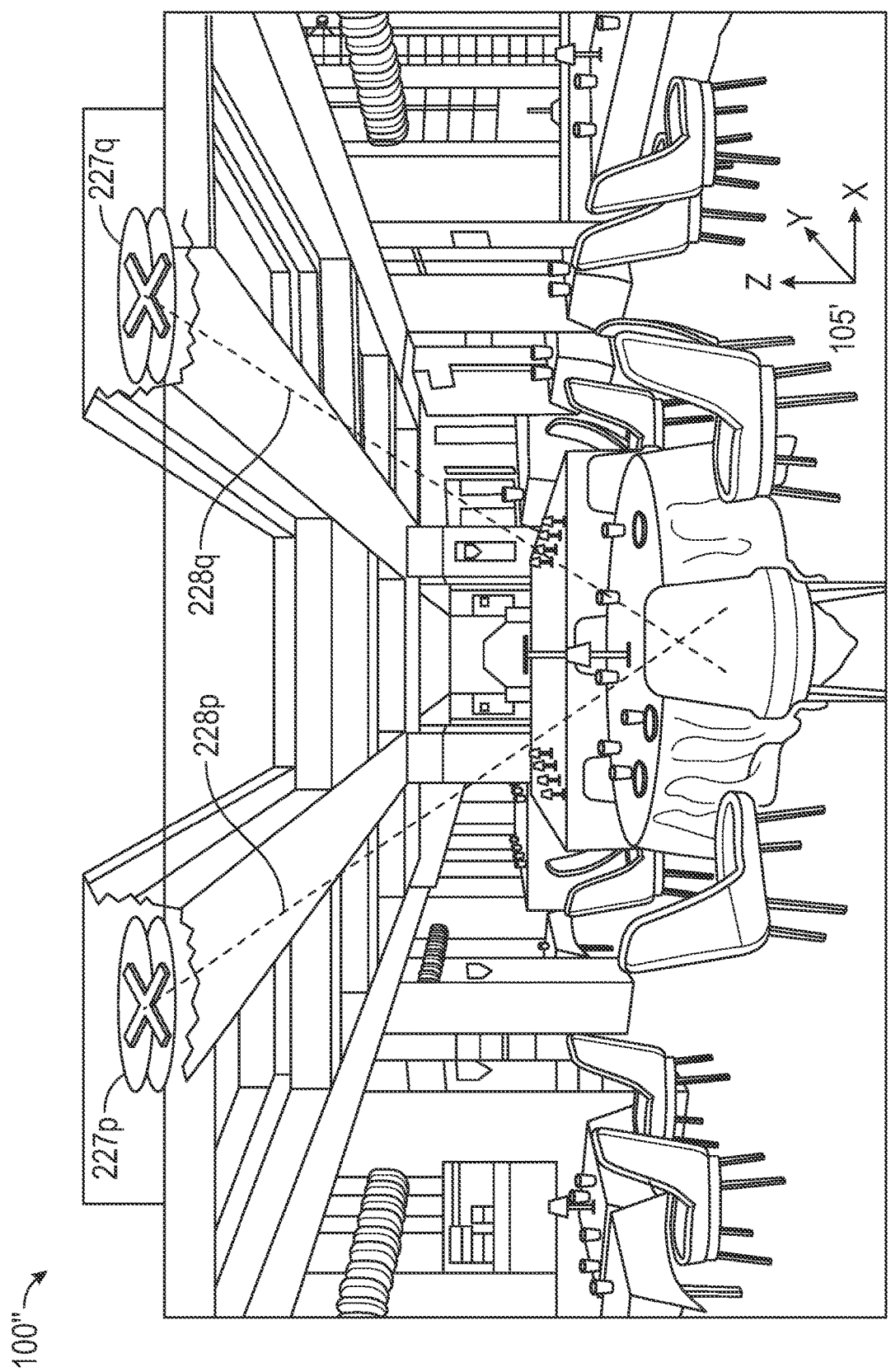
FIG. 2B illustrates a flexible fourth environment that includes a movable mechanism for identifying the specific locations of P/PAS emitters of respective charge-incurring individuals.

FIG. 2B illustrates another configuration 100" in which plural P/PAS emitter detecting and identifying scanner modules (227p and 227q being two of them) are supported from the ceiling and optionally hidden within RF-transparent containment channels. Two of the respective ΔRSS=0 vectors (e.g., 228p and 228q) are swept over time to intersect at successive ones of the seating positions for thereby detecting isolated presence of P/PAS emitters of specific patrons and to identity those specific patrons as being at the specific seating positions (A1's) and at specific times (T1's) including when charge-incurring orders are recognized (by a waitress or otherwise) as having been placed from roughly that same location and roughly at the same time. In one embodiment, the ceiling mounted P/PAS emitter detecting and identifying scanner modules (227p and 227q being two of them) are each rotatable in the XY plane (see reference 105') so that pairs of the enclosed antennas can be used to sweep different areas as desired. In one embodiment, the ceiling mounted P/PAS emitter detecting and identifying scanner modules (227p and 227q being two of them) are translatable parallel to the XY plane so as to accommodate re-configurations of the underlying tables and chairs. The translation movement of the scanner modules may be confined to being within the illustrated, interconnected containment channels. Movement may be realized with a system of in-channel support rails or by other appropriate means.

Figure 3A:
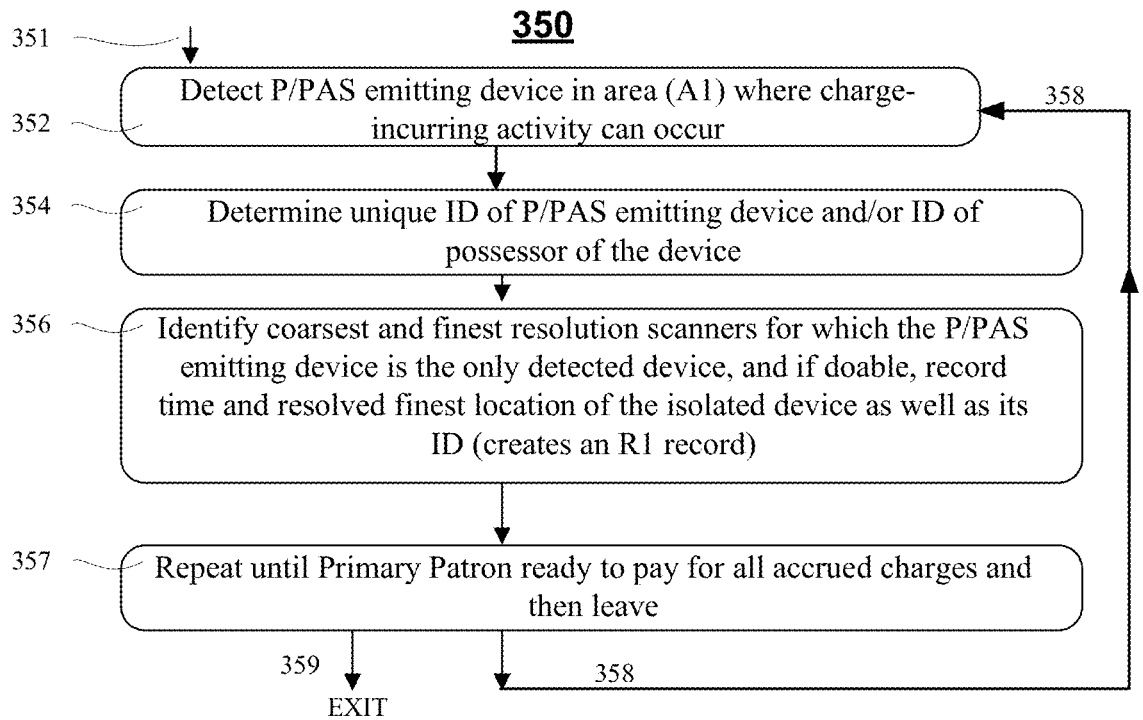
FIG. 3A is a flow chart of a first machine-implemented automated process for detecting presence and identity of patrons at locations where they may engage in charge-incurring activities.

Referring to FIG. 3A, details are shown for a first machine-implemented automated process 350 for detecting presence and identity of specific P/PAS emitting devices of respective patrons at locations at which they may engage in charge-incurring activities. Entry into the process may be made via pathway 351. At step 352, a scanner with appropriate resolution and range is used to detect isolated presence of a P/PAS emitting device in an area where a charge incurring activity can occur (e.g., a seating position at a restaurant table or bar). In subsequent step 354 and responsive to the detection of the isolated presence in step 352, a determination is made of the unique identification of the P/PAS emitting device and or the specific identification of the possessor of that device (e.g., full name of the patron sitting at the scanned seating position). In step 356, and for cases where plural scanners of differing range and resolution can be used to isolate a specific P/PAS emitting device as being the only one in that area (see 115d of FIG. 1C), the identities of the finest resolution and coarsest resolution among such scanners is recorded. Also in step 356, a corresponding R1 record is generated and stored indicating the time (T1) of presence detection, the finest resolution area (A1) in which the P/PAS emitting device was isolated as being in and the identification of the P/PAS emitting device. Optionally if then doable, the identity of the person carrying the detected and isolated P/PAS emitting device is also recorded. Step 357 repeats the process by following looping path 358 until the primary patron or another patron taking responsible for paying for correspondingly incurred charges indicates they are ready to pay and go. At that point and exit is made via path 359. It is to be understood that the rate of R1 record creations should be sufficiently high to capture temporally spaced apart P/PAS emissions and to overlap with temporally spaced apart charge-incurring activity recognitions. It is also to be understood that multiple instances of automated process 350 may be respectively executing in parallel for different primary patrons and their respective party of related companions. Thus, while one patron may indicate he or she is ready to pay and go, instances of automated process 350 associated with unrelated other non-leaving primary patrons and their respective group of companions continue to execute.

Figure 3B:
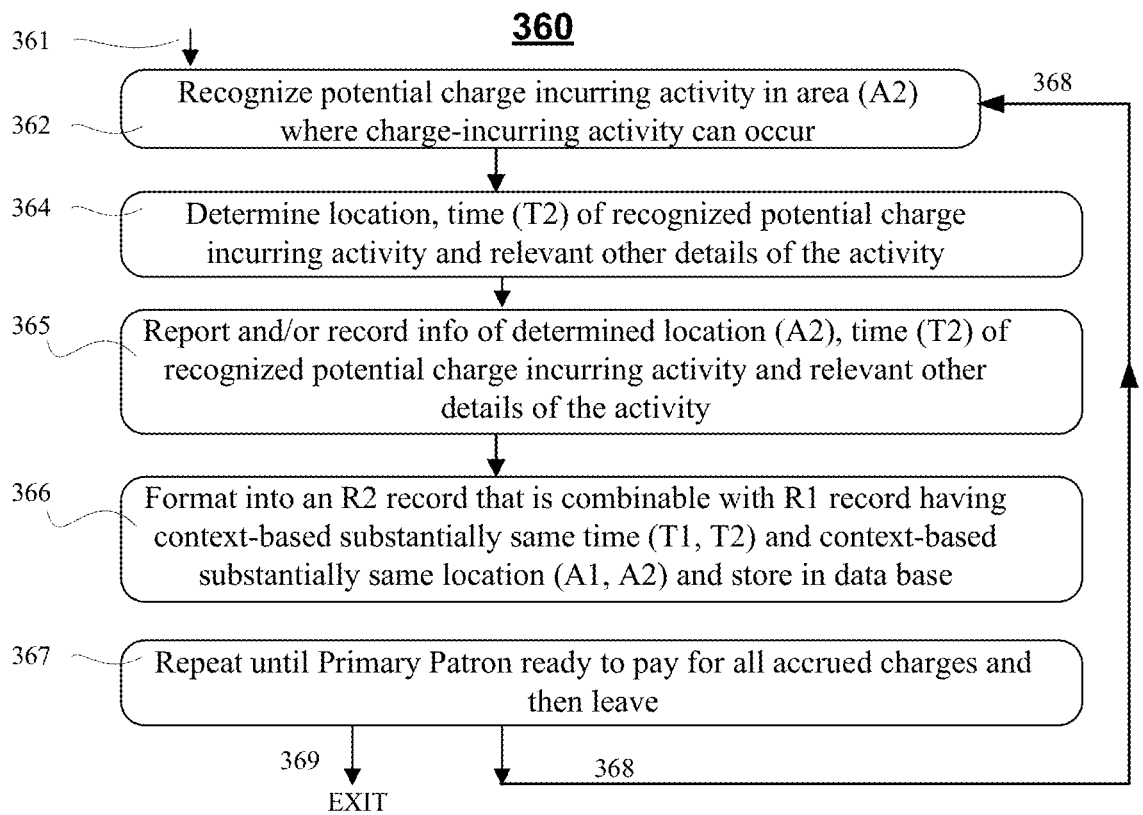
FIG. 3B is a flow chart of a second machine-implemented automated process for detecting the occurrence of charge-incurring activities at specific locations and times.

Referring to FIG. 3B, details are shown for a second machine-implemented automated process 360 for recognizing the occurrence of charge-incurring activities at specific locations and times. Entry may be made by way of path 361. At subsequent step 362 a detection is made of a potential charge-incurring activity in a specific area (A2) where such charge incurring activity can occur (e.g., placing an order fora food/drink item from a seating position at a table or bar). Although not necessary, preferably the activity recognition of step 362 is performed in a fully automated or semi-automated manner. For example, a movable computer tablet (e.g., vertically mounted on an angled stand—not shown) may be disposed at a restaurant table and configured so that patrons may move it to a convenient viewing angle and then place respective orders through that monitor without calling upon a waitress at that time. The placement of an order by way of such a tablet can be an example of automated detection of the placement of an order at a given time and from a given location where the movable tablet had been translated to for viewing by respectively located patron. The automated detection of item removal in FIG. 1D is another example. Alternatively, the activity recognition of step 362 may be a manual one where a member 140 of the provider's staff hears a patron making a request and records the time of the request, the seating position or other such location from which the request was made and details of the request (e.g., what food/drink items were ordered). The manually taken order is then converted into digital form. In general the created R2 records do not necessarily or inherently provide a specific identification of the patron who engaged in the recognized charge-incurring activity.

Step 364 corresponds to the gathering of information respecting the rough location (A2) and rough time (T2) at which a potential charge incurring activity is recognized to have taken place as well as providing relevant further information characterizing the recognized activity (e.g., what was ordered, quantity, customizations, etc.). In some embodiments, the recognized activity is initially denominated as being potential rather than definite because the patron can change his or her mind. For example in the environment of FIG. 1D, the shopper 110a may return the inspected item to the shelf within the predetermined time duration t2 and thus indicate that a corresponding charge not be incurred or should be revoked. In the restaurant order-taking examples, a patron may inform the waitress 140 that he or she has changed their mind and wants to cancel or edit the order before the waitress 140 transmits the order to the kitchen or before the kitchen completes the preparation of the item.

In subsequent step 365 where an order or other charge-incurring activity appears to be more definite, the collected information is formatted into a R2 record that is combinable with a substantially matching one or more of plural R1 records produced by process 350. The combining occurs based on the R1 and R2 records indicating substantially same time and substantially same place where the recognized charge-incurring activity occurred and where a corresponding P/PAS emitting device was detected as being present in a substantially isolated manner (no alternative unrelated patrons could have reasonably then carried out the recognized activity). Step 367 is repeated until the corresponding primary patron or another responsible person indicates they are ready to pay for all accrued charges and then leave on a pay-go-whenever-ready (PGWeR) basis. An exit is then taken by way of path 369. It is to be understood that multiple instances of automated process 360 may be respectively executing in parallel for unrelated different primary patrons and their respective party of companions. Thus, while one patron may indicate he or she is ready to pay and go, instances of automated process 360 associated with other non-leaving primary patrons and their respective group of companions continue to execute.

Figure 3C:
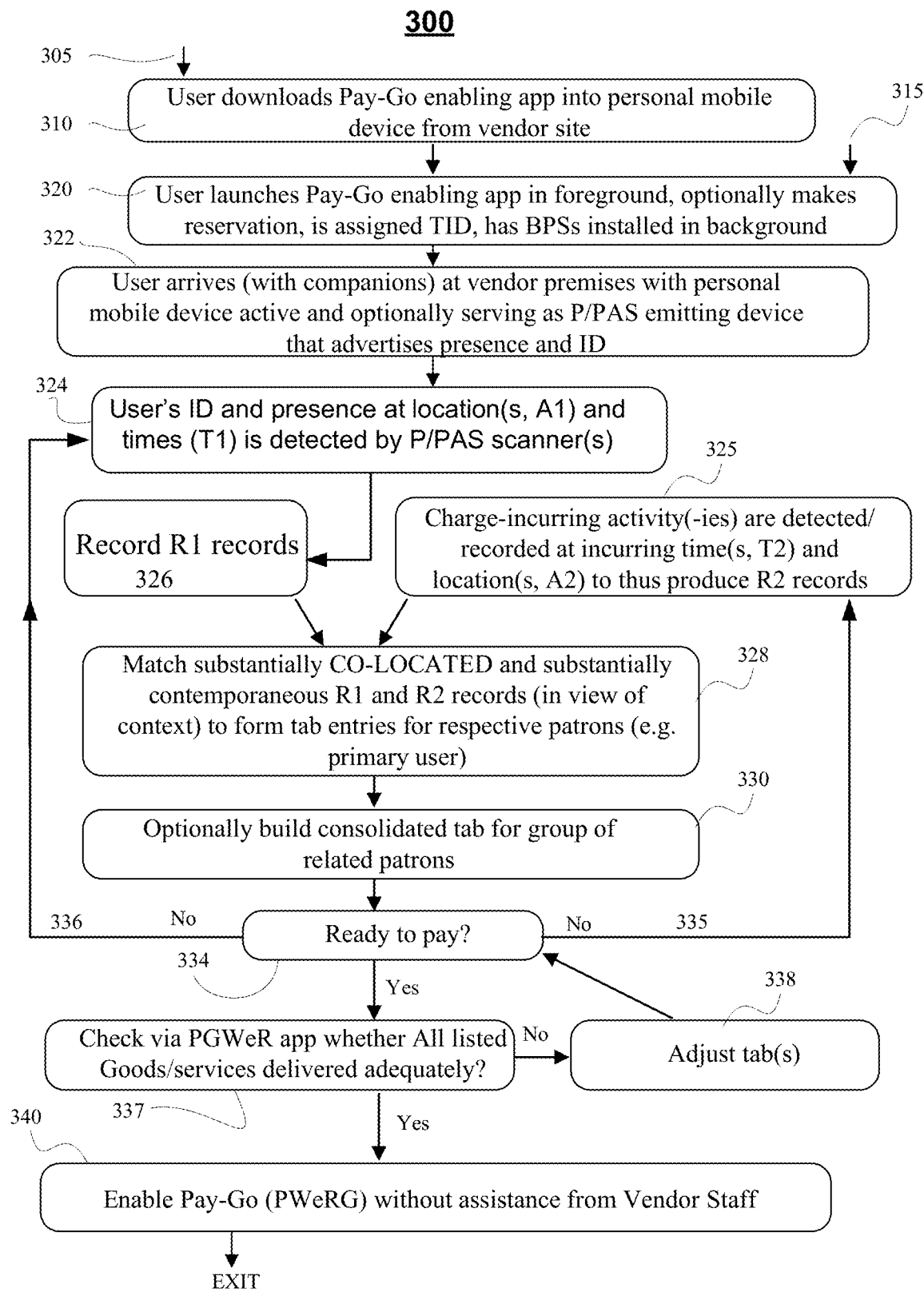
FIG. 3C is a flow chart of a third machine-implemented automated process in which an expandable tab for a given patron is built up by matching to one another records of substantially co-located and substantially contemporaneous presence and charge-incurring activities.

Referring to FIG. 3C, shown is a flow chart of a third machine-implemented automated process 300 in which an expandable tab (e.g., 114) for a given patron (e.g., 110, 110a, 110b) is built up by matching to one another records (e.g., Rts and R2's) of substantially co-located and substantially contemporaneous presence detection and recognized charge-incurring activities. Entry for first-time use of the method 400 may occur at 305, whereas later entry may occur at 315. In step 310 a user downloads into his/her normally used personal mobile device (e.g., smartphone or a smartwatch or another normally or routinely carried and/or worn personal wireless device) a vendor-provided pay-go-whenever-ready (PGWeR) enabling application (app) that is configured for accessing generated patron tabs for charge-incurring activities produced at one or more of the vendor's premises (e.g., fast food establishments, sit-down restaurants, big box store item pickup areas). The PGWeR enabling app may optionally be additionally configured for placing orders or requests before arriving at or while at one or more of the prespecified vendor's venues (e.g., fast food establishments, sit-down restaurants, big box store item pickup areas) and/or for providing an identified patron with progress information such as when, where and how to receive the requested goods and/or services. It is within the contemplation of the present disclosure that the PGWeR enabling portion, the order or request submitting portion and the progress advisement portion are provided as two or more separate programs rather than one combined app. The PGWeR enabling portion, the order or request submitting portion and the progress advisement portion may be downloaded via the Internet and from one or more vendor-specified websites. In one embodiment, the PGWeR enabling app as well as the optional order or request submitting portion may first be downloaded into a desktop or laptop computer of a user and used for ordering where after the PGWeR enabling portion and the optional progress advisement portion are later transferred into a personal mobile device (e.g., 115) of an identified patron (e.g., 110) for execution in that personal mobile device (e.g., 115).

In a subsequent step 320, the user launches the app as a foreground executed process on his/her normally used personal mobile device (e.g., smartphone 115) and, in one embodiment, uses the personal mobile device as his/her P/PAS emitting device as well. Typically, the PGWeR enabling app will cooperate with an in-cloud server and obtain from there a unique identification to be used for the user and an identification of a time range in which the user is to expect legitimate charge-incurring activities to occur. The user may modify the latter as needed. In one variation, the user places an advance order that is to be carried out after arriving at the venue by way of venue-provided ordering mechanism (e.g., the order or request submitting portion of the downloaded app). In one embodiment, a corresponding in-cloud server downloads a unique and temporary identification number or other sequence (TID) to the personal mobile device (115) where this TID is uniquely associated with the specific order. In one embodiment, the app also optionally establishes within the user's personal mobile device one or more background peripheral services (BPSs) which may be dynamically connected to by external devices (e.g., the scanners 127a-127n at or near the vendor's venue). When a first of these established BPSs is connected to, and it temporarily awakens, broadcasts a Bluetooth™ signal containing the TID that has been assigned to the order and then goes back to sleep. The first BPS does not block the user from accessing foreground applications or services on his/her personal mobile device and does not consume significant battery power. These optional aspects are detailed in the here incorporated-by-reference U.S. patent application Ser. No. 16/232,849 (LOCAL EPHEMERAL LOCATION TRACKING OF MOBILE DEVICE USERS) and will thus not be further explained. In one embodiment, a second of the BPSs causes the user's mobile device to relay to a vendor accessible server current location information of the mobile device as determined based on connection to cellular telephony equipment. In one embodiment, a second of the BPSs causes the user's mobile device to relay to a vendor accessible server, current location information of the mobile device as determined based on received GPS signals or and/or received triangulation signals from beacons distributed about the vendor's premises.

In step 322 the user/patron (P1) arrives at the establishment and enters a scanners-covered area of the vendor's establishment while carrying his/her normally used mobile device (e.g., smart phone 115). For one class of embodiments (e.g., Apple iPhones™) the operating system (OS) of the mobile device automatically detects presence of external Bluetooth™ devices and occasionally broadcasts its own Bluetooth™ signals to thereby autonomously advertise its presence in the area and declare a current hardware address code (HAC) by way of which the personal device may be addressed. In one embodiment, the OS occasionally changes the HAC by which it is to be addressed.

In step 324 one of scanners 127 (e.g., a Bluetooth™ or UWB receiver) detects the repeatedly broadcast Patron-presence and Patron-identifying Advertising Signal (P/PAS; e.g., an automatically advertised HAC signal) and sends it as well as time of detection into a local database for recordation as a corresponding R1 record. This is done periodically or otherwise automatically and repeatedly based on context so that a stream of R1 records are generated keeping track of where the patron's presence is detected and when. In one embodiment, this activity is limited to locations (A1) where the patron can engage in a charge-incurring activity. Old R1 records that have not been matched up to a substantially similar R2 record and that have a timestamp earlier than a moving time window may be automatically deleted from a listing of such R1 records by a garbage collecting subroutine.

Step 326 represents the automatically repeated recording of the R1 records for respective patrons. Each patron (or each P/PAS emitter) will have his/her (its) own listing of times (T1) and locations (A1) where presence was detected.

Step 325 represents the automatically repeated recording of recognized charge-incurring activities including the corresponding area (A2) in which the activity was recognized as occurring and the time (T2) at or during which it was recognized as occurring. As already explained in conjunction with FIG. 1C, the scope and size of the respective activity recognition areas (A2's) may vary and may be different from the scope and size of the respective presence detection areas (A1's). Similarly, the chronological scope and precision of the respective activity recognition times (T2's) may vary and may be different from the chronological scope and precision of the respective presence detection times (T1's).

Step 328 represents the automatically repeated finding and combining of R1 and R2 records of respective patrons (and/or of their respective P/PAS emitters) based on context and substantial proximity in time and space for those records given the then extant context. Context determines whether the respective areas (A1, A2) and times (T1,T2) of respective R1 and R2 records are to be considered as being substantially proximate to one another in respective spatial and chronological terms. As hinted at above, these determinations may be based on fixed rules established by the provider for all or respective parts of the provider's premises, or based on variable rules stored within a rules-based expert knowledge database used by the provider and/or based on conclusions reached by AI software that has been pre-trained to respond to different contextual situations in all or respective parts of the provider's premises. More to the point, for flexible seating restaurants such as depicted in FIGS. 2A and 2B, the definitions of what constitute A2 second areas for recognition by waitresses servicing those areas (e.g., as table numbers, table plate spots, seats, etc.) may vary as the tables and chairs are rearranged. The margins of differences allowed respectively for the respective spatial and chronological comparisons may vary depending on how crowded and busy the restaurant is. For example, if the tables/chairs are packed very tightly and orders are being taken at a relatively fast pace, the first areas (A1) in which patron presence is to be isolated may have to be relatively small and the proximity between time of presence detection (T1) and time of order taking (T2) may have to be a close one so as to avoid confusing orders placed by one patron with those of an unrelated other patron. On the other hand, if there is wide separation between tables and wide separation between table setting locations and additionally, orders are being taken at a relatively slow pace, then the first areas (A1) in which patron presence is to be isolated may be relatively large and the allowed proximity between time of presence detection (T1) and time of order taking (T2) may be relaxed to being longer while still avoiding the danger of confusing orders placed by different patrons. Similarly in the shopping aisles context of FIG. 1D, more stringent or less stringent requirements for respective spatial and chronological comparisons may vary depending on how crowded and busy the respective aisles are (e.g., how many unrelated patrons are packed into the aisle and what frequency of item removal is taking place). The outcome will vary from one context to another and thus determination of what constitutes substantial proximity should be context based.

Step 330 represents the optional consolidation of combined R1 and R2 records of related patrons (e.g., family members) into a consolidated group invoice that can be paid for by any qualified member of the set of related patrons (e.g., whoever volunteers to pick up the tab). In one embodiment, each of the qualified members of the set of related patrons has access to the pay-go-whenever-ready (PGWeR) enabling app that is executing for that group and may use his/her credit card for immediate payment and thus enable departure on a pay-go-whenever-ready (PGWeR) basis.

At step 334, if the respective patron (e.g., primary patron 110) or group of related patrons is not yet ready to pay and leave then control returns to the optional generation, matching and combining of more substantially similar R1 and R2 records as represented by return paths 335 and 336. On the other hand, if a qualified member of the group of related patrons (or if an alone primary patron) is ready to pay and leave, then the pay-go-whenever-ready (PGWeR) enabling app is accessed in step 337. It lists all the invoice items generated and stored thus far. If the reviewing group member (e.g., 110) finds this list acceptable as is (in other words, he determines that all goods/services have been adequately provided and properly charged for), he can step the PGWeR app to the payment process of step 340, automatically pay for the incurred charges without assistance from any member (e.g., 140) of the provider's staff and then just leave. By contrast, if there is problem, the respective patron (e.g., primary patron 110) may activate an adjust tab(s) option of the PGWeR app in step 338 by way of which any problems with the tab are communicated to an adjustments service center for dealing with. If the adjustment meets with approval by all parties, control returns to steps 334 and 337 for enabling completion of the pay-go-when-ready process (PGWeR).

Figure 4A:
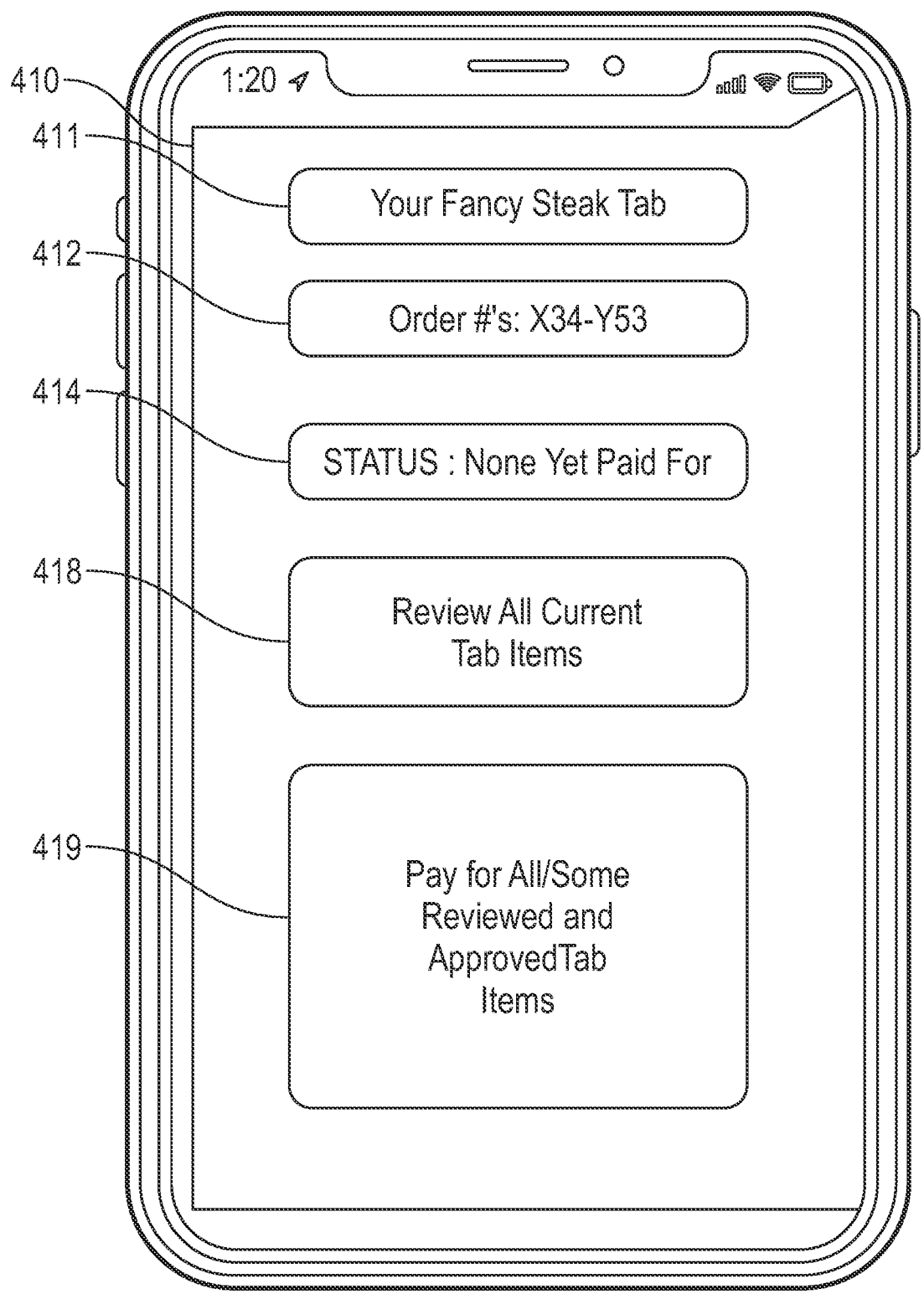
FIG. 4A illustrates a mobile device application that allows a charges-incurring individual to review all charges currently tallied up and then to optionally pay for them without assistance from a provider staff member (a.k.a. Pay-Go-WhenEver-Ready or "PGWeR").

FIG. 4A depicts a first state 410 of a pay-go-whenever-ready (PGWeR) enabling application executing in a qualified patron's mobile communication device (e.g., smartphone). A heading field 411 identifies the name of the goods/services provider (e.g., Fancy Steak) for which a running tab of incurred charges is being maintained. A second field 412 identifies the placed orders that have so far been recognized as being associated with the patron or patron's group. A third field 414 indicates the payment status for the tracked orders (e.g., not yet paid for). A fourth field or touch-activated action button 418 allows the user to review all tab items compiled thus far. A fifth field or touch-activated action button 419 allows the user to now pay for some or all of the reviewable tab items compiled thus far without need for intervention by an on premise member (e.g., 140) of the provider's staff.

Figure 4B:
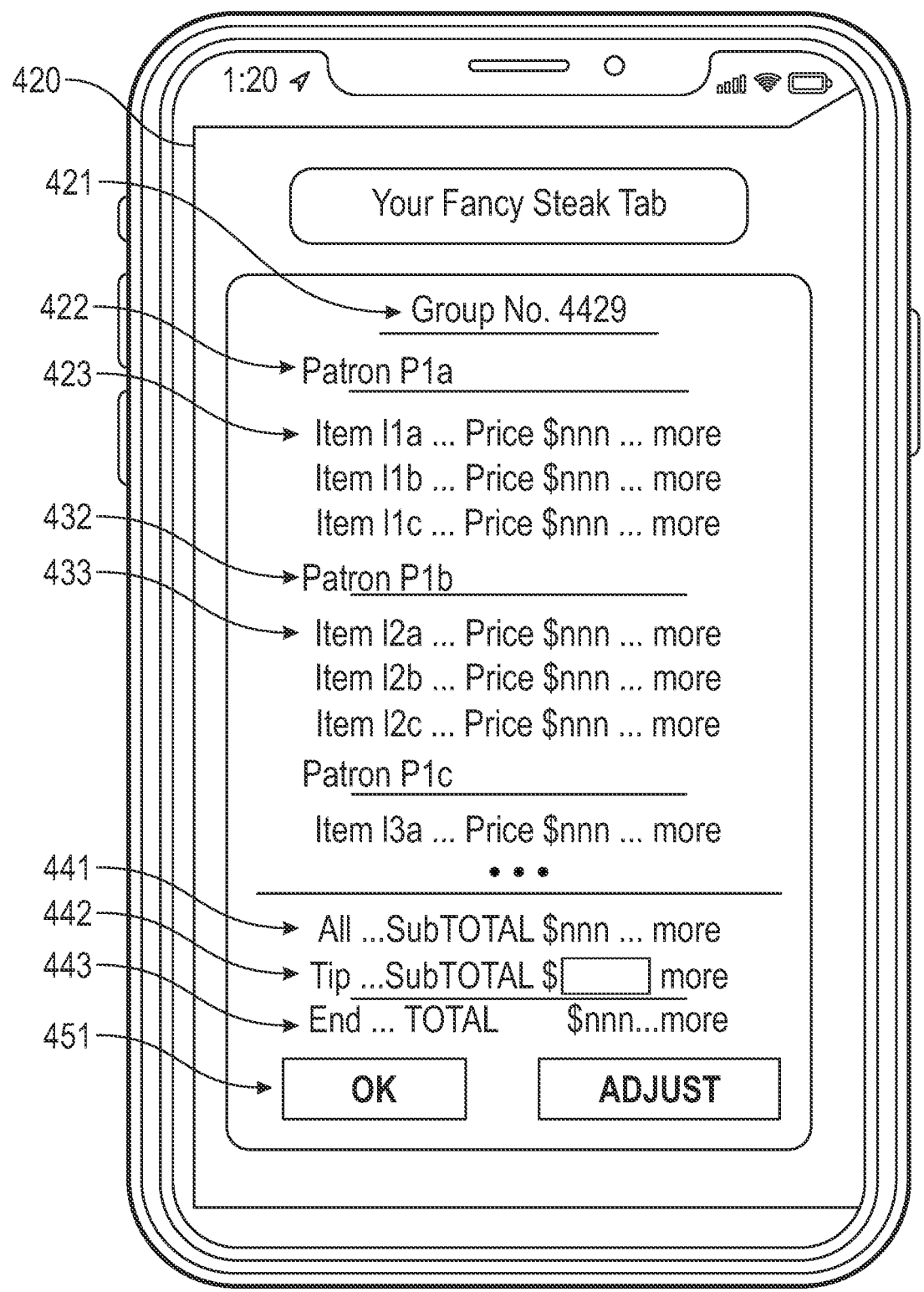
FIG. 4B illustrates another state of the pay-go-whenever-ready (PGWeR) enabling application of FIG. 4A.

FIG. 4B depicts a second state 420 of the pay-go-whenever-ready (PGWeR) enabling application executing in the qualified patron's mobile communication device (e.g., smartphone). A heading field (no reference number) continues to identify the name of the goods/services provider (e.g., Fancy Steak) for which a running tab of incurred charges is being maintained. A second field 421 identifies a group designation for a group of related patrons (P1*a*, P1*b*, P1*c*, etc.) whose charge-incurring activities thus far are being tracked. More specifically, a first of the related patrons, P1*a* is named in a third field 422. Indented below that and listed are identifications 423 of charge-incurring items (e.g., placed food orders) compiled thus for the first patron P1*a*. A second of the related patrons, P1*b* is named in a further field 432. Indented below that and listed are identifications 433 of charge-incurring items (e.g., placed food orders) compiled thus for the second patron P1*b*. Charge-incurring actions of yet additional ones (e.g., P1*c*) of the members of the Group (421) can be yet additionally listed below. Each charge-incurring item (e.g., Item I1*a*, I1*b*, I2*a*, etc.) has its associated price (e.g., $nnn) listed next to it. The user may activated a "more" filed further to the right to receive information about additional details related to each respective charge.

Bottom line fields 441, 442 and 443 list the current subtotal for all charge-incurring activities of the group (421), the current tip amount to be split among the staff members (detailed via its "more" button) and the current end total with tips included.

Action buttons 451 (OK and ADJUST) allow the user to approve the currently listed items as is or to request adjustment for one or more of them. Actuation of the OK button returns the user to the screen of FIG. 4A where the bottom area 419 may be used for paying for all OK'ed charges without need for intervention by a staff member present at the provider's premises. The payment making patron may then be free to immediately leave the premises if all obligations have been resolved.

Figure 5:
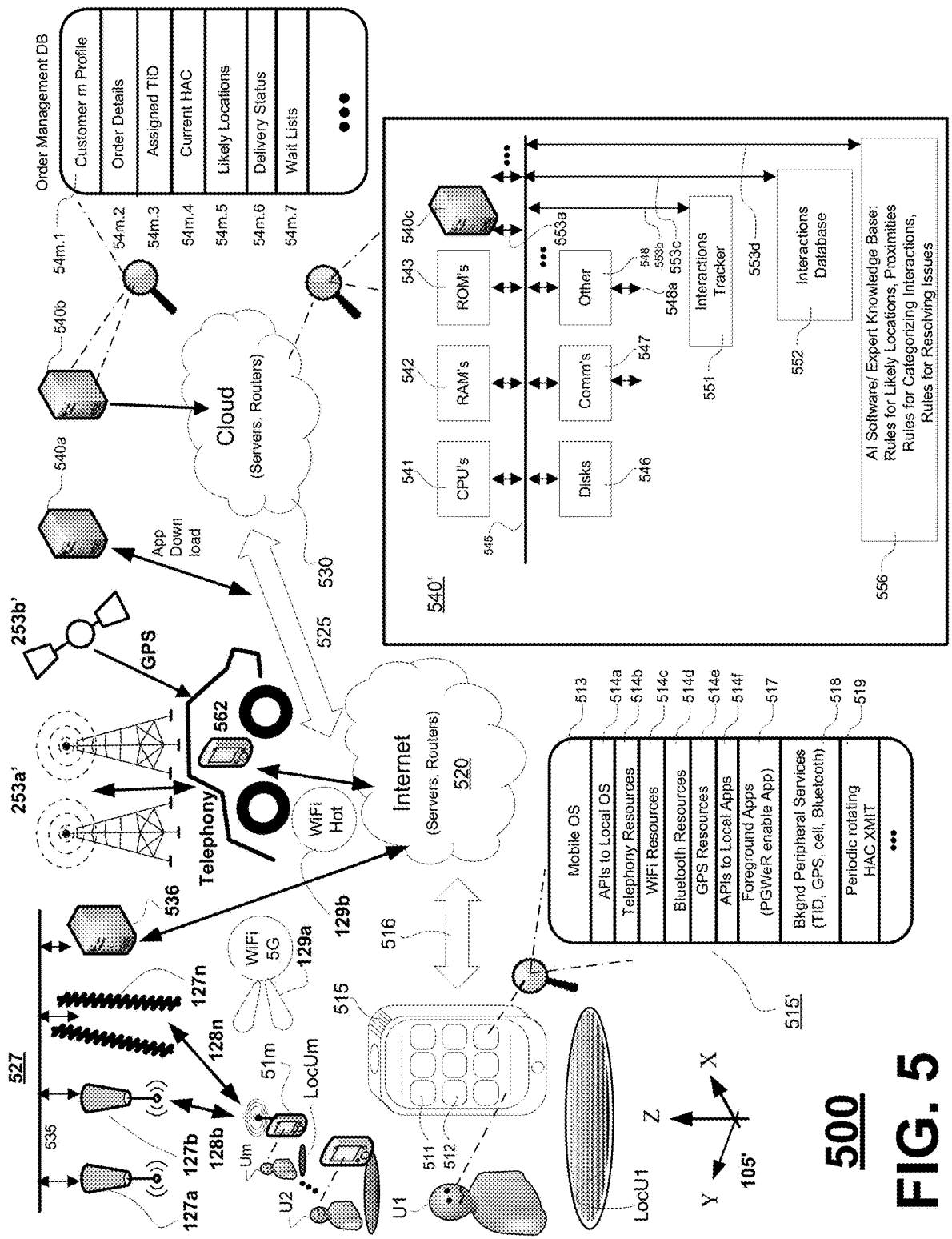
FIG. 5 illustrates a system within which the here disclosed processes can take place.

Referring to FIG. 5, illustrated is a system 500 configured for location sensitive management of interactions with patrons where the system 500 includes portions for automatically determining both coarser and pinpointed respective locations (e.g., LocU1, . . . , LocUm) of respective mobile users (e.g., U1, U2, . . . , Um) using their respective mobile devices (e.g., 515, . . . , 51*m*) or other such P/PAS emitting devices carried and/or worn by the users as the users traverse various areas including those serviced by cellular telephony base stations (e.g., cell towers 253*a*'), serviced by GPS satellite constellations 253*b*' and serviced by finer resolution, location determining means (e.g., scanners 527—including co-located plural directional antennas such as the Yaggi pair shown at 127*n*). It is within the contemplation of the disclosure to use various types of scanners such as Wi-Fi based ones (e.g., generation 5G ones that provide aimed beams), Bluetooth based ones, UWB based ones and so on. When a user enters a repeatedly scanned finer resolution area (e.g., area covered by scanners 527 corresponding to 127 of FIG. 1A and 127*n*' of FIG. 1D), the user's presence at respective locations and times can be determined to medium and finer degrees of resolution and greater reliability than that possible with just GPS and/or cellular telephony resources. This more reliable and more finely resolved level of presence detection can be used to discriminate between patrons even if they are standing back to back in a crowded shopping aisle (see FIG. 1D). Thus, otherwise recognized charge-incurring activities can be reliably allocated to the specific patron based on where he or she was situated at approximately the same time that the charge-incurring activity was recognized to have occurred (e.g., when a shelf item was removed and not timely returned back to that shelf area).

As indicated in magnified details area 515' of FIG. 5, an exemplary respective mobile device 515 of exemplary user U1 typically has a predetermined operating system (OS) 513 currently executing within it. Device 515 may have a set of application program-to-OS interfaces (APIs) 514*a* for allowing various further programs 517 within the device 515 to access resources of the OS 513. In one embodiment, the OS allows for OS mediated control over local telephony resources 514*b*, Wi-Fi interface resources 514*c* (e.g., including generation G4 resources), Bluetooth™ resources 514*d*, and GPS resources 514*e*. One of the API accessible resources of the OS is that for establishing one or more background peripheral services (BPSs) 518 that may be dynamically and wirelessly connected to from external devices (e.g., scanners 127*a*-127*n*). The executing OS 513 may on its own periodically test for presence of nearby Bluetooth™ and/or Wi-Fi devices (e.g., scanners 127*a*-127*n*, 5G Wi-Fi routers 129*a*, 129*b* and alike other such short range transceivers) and in response to detected presence, occasionally wirelessly broadcast its own Bluetooth™ beacon and/or repeated Wi-Fi signal or other presence-advertising signal which includes a current hardware accessing code (HAC) of the mobile device 515. In one embodiment, the Bluetooth™ advertising signal has a unique and consistent signature portion that can be used for locating the HAC code as being positioned at a predetermined bit position of fixed bit distance away from a unique signature portion of the PA-signal. The HAC code may extracted based on its predetermined bit position relative to the signature even though the HAC code itself changes on a pseudorandom basis. The schematic of FIG. 5 illustrates the code for occasionally transmitting a rotating HAC as being disposed at section 519 of the personal mobile device. The schematic of FIG. 5 also depicts one or more of established BPSs at area 518. One of the BPSs is one which transmits a Bluetooth™ signal including an associated TID (a system-assigned temporary ID sequence for the mobile device) when that BPS is connected to. Another of the BPSs is one which transmits a Wi-Fi signal revealing the current GPS coordinates of the mobile device 515 as well as identifying the mobile device (e.g., by its currently assigned TID). This Wi-Fi signal can be routed out via the internet to a server (e.g., 540*b*) controlled by the establishment. Another of the BPSs is one which transmits a Wi-Fi signal revealing the current cellular telephony coordinates of the mobile device 515 as well as identifying the mobile device (e.g., by its currently assigned TID). This Wi-Fi signal can be routed out via the internet to a server (e.g., 540*b*) controlled by the establishment. The establishment controlled server (e.g., 540*b*) may then determine current coarse locations of the mobile device based on the received GPS and/or telephony information and store the results in corresponding database entries (e.g., 54*m*.5).

Various foreground programs that may be used by the user are depicted as being present in area 517. APIs to the local apps in the mobile device are depicted as being present in area 514*f*. One of the foreground programs that will be running in region 517 in accordance with one embodiment is the pay-go-whenever-ready (PGWeR) enabling application (see for example FIGS. 4A-4B). Other foreground programs that may be running in region 517 can include the provider's remote ordering and order progress advisement program. An example of an initial, program launching GUI for the mobile device is depicted at 515 with application invoking icons such as 511 and 512 being present on the displayed graphical user interface. One of the application invoking icons (e.g., 511 or 512) may cause a launching of the PGWeR enabling application. Another of the application invoking icons may cause a launching of the provider's remote ordering and order progress advisement application. These applications are stored in area 517 after being downloaded for example from a vendor controlled server 540*a* located in cloud 530 or elsewhere on the Internet 520.

FIG. 5 more broadly depicts an integrated client-server/internet/cloud system 500 (or more generically, an integrated multi-device system 500) within which the here disclosed technology may be implemented. System 500 may be understood as being an automated machine system having distributed intelligent resources including a variety of differently-located data processing and data communication mechanisms including for example, user-carried/worn mobile wireless units (e.g., wireless smartphones 515, . . . , 51*m*) configured to allow end-users thereof (e.g., U1, U2 . . . Um) to request from respective end-user occupied locations (e.g., LocU1) services from differently located enterprise hosts (e.g., on-internet 520 and/or in-cloud servers 540*a*, 540*b*, etc.). In one embodiment, server 540*a* handles the downloading of the PGWeR enabling and vendor ordering and order progress advisement apps into mobile devices that request them. The downloading process may include generating unique customer profiles (e.g., including billing information) and specific customer identifications that are to be used when the respective customers place orders at a later time. In one embodiment server 540*b* handles the managing of placed orders. Server 540*b* may include or connect to an order management database which keeps track for each order-placing user (e.g., user Um, where m is an integer) of: (a) the user's customer profile 54*m*.1, (b) the details of the placed order 54*m*.2; (c) a system-assigned temporary and unique customer and/or transaction identification sequence (TID) 54*m*.3 assigned to the corresponding customer/transaction; (d) a current hardware address (e.g., HAC) being currently used by the customer's personal mobile device (e.g., 51*m*.4); (e) a current one or more coarse and comparatively more pinpointed locations 54*m*.5 of where the recipient is determined to most likely be present at different times (e.g., in or near the establishment or further away and including those determined to high level of confidence using directional antennas 127*n*); (f) information about the delivery status 54*m*.6 of the requested goods and/or services that the present transaction is directed to; and optionally additional information as may be appropriate for the vendor's business model.

It is to be understood that the illustrated configuration of system 500 is merely exemplary. As indicated, it comprises at least a few, but more typically a very large number (e.g., thousands) of end-user devices 515 (only a few shown in the form of wireless smartphones but understood to represent many similarly situated mobile and/or stationary client machines—including the smartphone wireless client kinds, smart watches, vendor-supplied wrist-worn P/PAS emitting devices and cable-connected desktop kinds). These end-user devices 515 are capable of originating service requests which are ultimately forwarded to service-providing host machines (e.g., in-cloud servers like 540*b*) within a cloud environment 530 or otherwise on-internet or linked-to internet machines (e.g., 540*b*). Results from the service-providing host machines are thereafter typically returned to the end-user devices (515, . . . 51*m*) and displayed or otherwise communicated to the end-users (e.g., U1, U2, . . . , Um, m being an integer). For example, if the business of the vendor is an online, food pre-ordering one, the end-user (U1) may have installed on his/her smartphone (515) a software application ("app" 517) that automatically requests from the order managing server 540*b*, a list of nearest vendor venue locations, the menu of the items that may be ordered online and estimates for when the items will be ready for pick up at a selected one of the venues. In response to the request, enterprise software and hardware modules automatically identify the user, pull up a user profile (e.g., 54*m*.1), store the order details (54*m*.2), assign a temporary and unique transaction identification sequence (TID) 54*m*.3 to the corresponding transaction (install it into a corresponding one or more BPSs) and inform the customer of a time range when he or she might arrive at the venue to pick up the order as well a specific location for the pickup (e.g., a drive-through window with directional antenna detection of the user being directly in front of the window). The assigned TID may be downloaded into the BPSs of the ordering app at that time order placement or at a later time before it is needed.

When the customer (e.g., Um) arrives at the designated venue and enters an area covered by the location pinpointing scanners (127*a*-127*n*) of the venue, a fine resolution locating process is automatically carried out. Briefly, in one embodiment the presence of the HAC advertising mobile device is detected; an attempt is made to dynamically connect wirelessly to the TID-returning BPS of that mobile device; the TID is detected by at least one of the location pinpointing scanners (127*a*-127*n*) and the respective strengths of the TID-providing signals are measured at respective ones of the scanners including substantially simultaneously at co-located directional antennas. More specifically and merely as an example, if TID-returning signal 128*n* has the same relative signal strengths (RSSI's) at divergent directional antennas 128*n* then it may be automatically determined that the corresponding mobile unit 51*m* is located midway between antennas 127*n*. (Signal weighting may be used to pick a detection vector in the covered area other than the midway one.) As another example, a set of scanners forming a closed regular polygon and each receiving the TID at just above a predetermined signal strength threshold are identified and the personal mobile device is automatically determined to be at the center of formed polygon (e.g., a triangle, rectangle, etc.). The scanners report their respective detections and measurements to a local server 536. The local server 536 then consults with a database or expert rules knowledge base and/or pre-trained AI software to pinpoint the most likely one or more locations for the targeted customer in view of other contextual factors (e.g., background noise, radio reflections, etc.) that may be currently present at the venue. The pinpointed one or more locations are then relayed to the tracking database, for example into entries region 54*m*.5. The entries region 54*m*.5 may store a history of recent locations at respective times and predictions of where the tracked user is most likely to be next located. A human or robotic server for assisting in quick delivery of the requested goods and/or services may then be dispatched to the predicted location of the customer. In one embodiment, an invoice detailing incurred charges is automatically built up for each payment-responsible patron. Whenever the patron wishes to or needs to leave, the patron can call up the pay-go-whenever-ready (PGWeR) enabling application and settle the bill without need for intervention by an on-premise staff member.

In one embodiment, signal coupling from each of the fine resolution scanners (127*a*-127*n*) to the local server 536 is a wireless one such as conducted over a Wi-Fi network. Alternatively, Bluetooth™ signals may be used where one scanner (e.g., 127*a*) relays its detections and measurements to the next adjacent scanner (e.g., 127*b*) and so on until the collected detection and measurement reports are relayed to the local server 536. Signals coupling link 535 represents the various ways in which the respective detections and measurements of the scanners (127*a*-127*n*) are relayed to the local server 536. The signals coupling link 535 may be a wired one and/or may include wired and wireless subportions as opposed to being an all wireless signals coupling link.

In one embodiment, after receiving the respective detections and measurements of the scanners as well as the detected TID sequence, the local server 536 connects via the Internet 520 to the order management server 540*b*. The order management server 540*b* uses the relayed TID sequence to reference the corresponding customer order details 54*m*.1-54*m*.7 of user Um and his/her corresponding order. The order management server 540*b* may additionally consult with an expert knowledge base and/or associated AI software 556 (example shown in server 540') to determine, based on the relayed signal measurements of the scanners, what the one or more most likely current locations of the customer are at the respective venue and for the extant contextual conditions there. When the ordered goods and/or services are ready for delivery to or pickup by the customer, the order management server 540*b* reports the latest one or more most likely locations of the establishment. For example the report may be in the form of a sorted list of most to least likely locations. In one embodiment, after pickup or delivery is reported as complete, the PGWeR enabling application is used to settle the bill without need for intervention by an on-premise staff member, the patron leaves, the corresponding TID and R1-R2 records are erased from the user's mobile device and also from the database storage locations (e.g., 54*m*.3) so as to preserve privacy.

Aside from the end-user devices (e.g., 515, . . . , 51*m*) and the cloud servers (e.g., 540*b*) the system 500 comprises: one or more wired and/or wireless communication fabrics 516, 525, 535 (shown in the form of bidirectional interconnects) intercoupling the end-user client devices (e.g., 515, . . . , 51*m*) with the various networked servers (e.g., 536, 540*a*, 540*b*, 540').

Still referring to FIG. 5, a further walk through is provided here with respect to detailed components that may be found in one or more of the mobile devices and/or respective servers. Item 511 represents a first user-activateable software application (first mobile app) that may be launched from within the exemplary mobile client 515 (e.g., a smartphone, but could instead be a tablet, a laptop, a wearable computing device; i.e. smartwatch or other). Item 512 represents a second such user-activateable software application (second mobile app) and generally there are many more. Each end-user installed application (e.g., 511, 512) can come in the form of nontransiently recorded digital code (i.e. object code or source code) that is defined and stored in a memory for instructing a target class of data processing units to perform in accordance with end-user-side defined application programs ('mobile apps' for short) as well as to cooperate with server side applications implemented on the other side of communications links 516, 525, etc. In one embodiment and the case where an order is placed for respective goods and/or services by way of a non-mobile or not normally used client machine (e.g., a desktop computer), the order management server 540*b* automatically recognizes this condition and uses data available in the customer's profile 54*m*.1 to access the user's normally carried, personal mobile device and to transfer the assigned TID to that normally carried personal mobile device. In this instance, it is understood that appropriate, vendor provided software has been preloaded into the normally carried personal mobile device for securely enabling such transfer of the TID to the targeted mobile device. In this way, even if the customer places the order by way of a home desktop computer and then arrives at the venue with his/her normally-used mobile device, the customer tracking subsystem will still work.

More generally, each app (e.g., 511, 512, 517) may come from a different business or other enterprise and may require the assistance of various and different online resources (e.g., Internet, Intranet and/or cloud computing resources). Each enterprise may be responsible for maintaining in good operating order its portions of the system (e.g., local scanners, local servers, Internet, Intranet and/or cloud computing resources). Accordingly, the system 500 is shown as including in at least one server 540', an expert knowledge base 556 which contains various kinds of different expert rules for handling different conditions. One set of expert rules may provide for optimized customer location pinpointing when all the scanners (e.g., 127*a*-127*n*) at a given venue or venue observable area 527 are operational. Another set of expert rules may provide for less than optimum but acceptable customer location pinpointing when less than all of the scanners are operational and/or background noise is high. Yet another set of expert rules may provide for variable location determination based on different sets of furniture layout at each respective venue and/or based on expected radio interferences and/or reflections at the given venue. Yet other of the expert rules may relate to categorizing different types of transactions and details about how to handle them, including how to resolve various problematic issues.

In addition to the expert knowledge base and/or AI software 556, one or more other portions of the system 500 may contain interaction tracking resources 551 configured for tracking interactions between customers and respective vendors and an interactions storing database 552 configured for storing and recalling the tracked interactions. Links 553*a* (to a further server 540*c*), 553*b*, 553*c* and 553*d* represent various ways in which the system resources may communicate one with the other.

As mentioned, block 540' is representative of various resources that may be found in client computers and/or the various servers. These resources may include one or more local data processing units (e.g., CPU's 541), one or more local data storage units (e.g., RAM's 542, ROM's 543, Disks 546), one or more local data communication units (e.g., COMM units 547), and a local backbone (e.g., local bus 545) that operatively couples them together as well as optionally coupling them to yet further ones of local resources 548. The other local resources 548 may include, but are not limited to, specialized high speed graphics processing units (GPU's, not shown), specialized high speed digital signal processing units (DSPU's, not shown), custom programmable logic units (e.g., FPGA's, not shown), analog-to-digital interface units (A/D/A units, not shown), parallel data processing units (e.g., SIMD's, MIMD's, not shown), local user interface terminals and so on.

It is to be understood that various ones of the merely exemplary and illustrated, "local" resource units (e.g., 541-548) may include or may be differentiated into more refined kinds. For example, the local CPU's (only one shown as 541) may include single core, multicore and integrated-with-GPU kinds. The local storage units (e.g., 542, 543, 546) may include high speed SRAM, DRAM kinds as well as configured for reprogrammable, nonvolatile solid state data storage (SSD) and/or magnetic and/or other phase change kinds.

The local communication-implementing units (only one shown as 547) may operatively couple to various external data communicating links such as wired, wireless, long range, short range, serial, parallel, optical kinds typically operating in accordance with various ones of predetermined communication protocols (e.g., internet transfer protocols, TCP/IP, Wi-Fi, Bluetooth™ and so on). Similarly, the other local resources (only one shown as 548) may operatively couple to various external electromagnetic or other linkages 548*a* and typically operate in accordance with various ones of predetermined operating protocols. Additionally, various kinds of local software and/or firmware may be operatively installed in one or more of the local storage units (e.g., 542, 543, 546) for execution by the local data processing units (e.g., 541) and for operative interaction with one another. The various kinds of local software and/or firmware may include different operating systems (OS's), various security features (e.g., firewalls), different networking programs (e.g., web browsers), different application programs (e.g., product ordering, game playing, social media use, etc.) and so on.

The advantages of the present teachings over the art are numerous. It is to be understood that the present teachings are not to be limited to specific disclosed embodiments. In the above description and for sake of simplicity, a fast food restaurant venue is described. However, this disclosure may be applied, but not limited to, theaters (e.g., dinner theaters), stadiums, arenas, train stations, airports, big box store pickup areas and many other venues where it is desirable to track and pinpoint the location of a user of a normally carried and/or worn personal mobile device without encumbering the user to carry other devices not belonging to the user and/or not normally carried by the user.

In accordance with various embodiments of the present disclosure, the methods described herein may be implemented using one or more hardware computer systems that execute software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

So to re-iterate, part of what is disclosed here is a method of managing a running tab (e.g., 114) for charge-incurring activities to be associated with a first patron (e.g., 110, 110*a*) present on premises of a provider of goods and/or services, the method being a machine-implemented one and comprising: (a) automatically detecting presence at a first time (e.g., T1) of a first P/PAS emitting device (a device that repeatedly broadcasts a Patron-presence and Patron-identifying Advertising radio Signal, e.g., 115) possessed by the first patron in a first area (e.g., A1) of the premises from where a charge-incurring activity can take place under a corresponding context of the premises; (b) automatically recognizing occurrence at a second time (e.g., T2) of a potential charge-incurring activity in a second area (e.g., A2, 1556*d*) of the premises; (c) automatically determining context-based substantial chronological proximity of the first time to the second time such that the first and second times can be matched in view of context; (d) automatically determining context-based substantial spatial proximity of the first area to the second area such that the first and second areas can be matched in view of context; (e) automatically determining that the first area in which presence of the first P/PAS emitting device was detected did not, during the first time, include one or more P/PAS emitting devices possessed by unrelated other patrons present at the premises; (f) in response to said determining of: context-based substantial chronological proximity of the first time to the second time, context-based substantial spatial proximity of the first area to the second area and to said determining of exclusion of the one or more P/PAS emitting devices possessed by the unrelated other patrons from the first area during the first time, matching (e.g., step 328 of FIG. 3C) a specific identification of the first patron or a specific identification of the first P/PAS emitting device with the potential charge-incurring activity recognized to have occurred in the second area; and (g) creating a combined record (e.g., R1+R2 of FIG. 1B) that combines the matched identification of the first patron or identification of the first P/PAS emitting device with the recognized potential charge-incurring activity detected in the second area and adding the created combined record to a stored running tab for potential charge-incurring activities associated with the first patron.

For the above re-iterated method and in one embodiment, the automatic detecting of presence at the first time of the first P/PAS emitting device includes using a first directional antenna (e.g., one of the two antennas shown at 127*n*' of FIG. 1D) for receiving a respective instance of the patron-presence and patron-identifying advertising radio signal (P/PAS) (e.g., detected with highest level of confidence along vector 128 of FIG. 1D).

For the above re-iterated method and in one embodiment, the automatic detecting of presence at the first time of the first P/PAS emitting device includes using a second directional antenna (e.g., the second of the two antennas shown at 127*n*' of FIG. 1D) for receiving a respective instance of the patron-presence and patron-identifying advertising radio signal (P/PAS), first and second directional antennas being co-located and coupled to relay their respectively received instances of the P/PAS to one or more respective radio receivers used for the co-located directional antennas, the co-located first and second directional antennas being directed to cover the first area (e.g., 1556*d*).

Further in the exemplary one embodiment, the automatic detecting of presence at the first time of the first P/PAS emitting device further includes, in the respective one or more radio receivers, determining one or more respective reception characteristics of the radio PA-signals that were received at a substantially same time by the first and second co-located directional antennas; and the automatic detecting of presence at the first time of the first P/PAS emitting device further includes determining a level of correlation between the determined one or more respective reception characteristics of the first and second respective radio PA-signals that were respectively received at a substantially same time by the first and second co-located directional antennas; and the automatic detecting of presence at the first time of the first P/PAS emitting device further includes using the determined level of correlation to generate a confidence signal that indicates the likelihood of presence of the radio PAS emitter within the first area.

For the above re-iterated method and in one embodiment, the respective reception characteristics of the first and second radio PA-signals include respective signal strengths received by way of the first and second co-located directional antennas.

For the above re-iterated method and in one embodiment, the method further comprises testing the generated confidence signal against a predetermined threshold level to determine if the P/PAS emitter is the only such P/PAS emitter within the first area and is therefore isolated within the first area.

For the above re-iterated method and in one embodiment, the method further comprises over time changing weights applied to the respective reception characteristics of the first and second radio PA-signals to thereby pinpoint location of the P/PAS emitter within the first area.

For the above re-iterated method and in one embodiment, the method further comprises moving the first and second directional antennas (e.g., 227p of FIG. 2B) to thereby modify the first area covered by the first and second directional antennas.

For the above re-iterated method and in one embodiment, the first area is disposed within premises of a food serving establishment (e.g., FIGS. 1A, 2A, 2B).

For the above re-iterated method and in one embodiment, the first area (e.g., 1556d of FIG. 1D) is disposed adjacent to a shelf from which items can be selectively removed for purchase of the removed items.

For the above re-iterated method and in one embodiment, the automatic recognizing of the occurrence at the second time of a potential charge-incurring activity in the second area of the premises includes: receiving a digitized report (e.g., R2) that identifies the second time and the second area without specifically identifying a patron who engaged in the potential charge-incurring activity.

For the above re-iterated method and in one embodiment, the received digitized report is derived from a manual report created by a staff member (e.g., 140) present on the premises of the provider.

For the above re-iterated method and in one embodiment, the received digitized report is derived from a report created by an automated activity recognition mechanism (e.g., 1556' of FIG. 1D) dedicated to detecting potential charge-incurring activities occurring the second area.

For the above re-iterated method and in one embodiment, the automated activity recognition mechanism is configured to withhold or retract the digitized report (e.g., R2) that identifies the second time and the second area if the potential charge-incurring activity is undone within a predetermined time duration.

Additionally, in one embodiment, a computer system is provided comprising one or more processors and a memory having collectively stored therein instructions that, when executed by the one or more processors, cause the one or more processors to execute a process that allows patrons at premises of a provider of goods and/or services to pay and leave, the executed process comprising: (a) recognizing charge-incurring activities within the premises that occur at corresponding locations (e.g., A2's) and times(e.g., T2's), the recognizing not inherently determining specific identities of patrons who engaged in the recognized charge-incurring activities; (b) based on the recognizing, producing a digital first record (e.g., R2) identifying a corresponding location and time of a recognized first of the charge-incurring activities and indicating a characterization of the recognized first charge-incurring activity; (c) automatically repeatedly determining respective locations of sourcing (e.g., A1's) and of times (e.g., T1's) of detection of a Patron-presence and Patron-identifying Advertising radio Signal (P/PAS) repeatedly broadcast by a P/PAS emitter (e.g., 115) possessed by a patron participating in the method; (d) producing respective second digital records (e.g., R1's) identifying the respective sourcing locations and times of detection of the P/PAS; (d) matching one or more of the produced respective second digital records with the first digital record based on substantial spatial and temporal proximity of the corresponding location and time identified in the first digital record with the matched respective sourcing locations and times of the matched one or more respective second digital records; and (e) combining at least one of the matched second digital records with the first digital record to produce a corresponding combination result (e.g., R1+R2 of FIG. 1B) and adding the combination result to an incurred charges list associated with the participating patron.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a digital processor of a digital programmable computer or other programmable data processing apparatus to produce a machine, such that the instructions, which execute via the processor of the computer or other programmable instruction execution apparatus, create a mechanism for implementing the functions/acts specified in the flowchart and/or block diagram block or blocks. All instructions need not be executed a by same one processor and can instead be distributed among a plurality of operatively cooperative processors. The terminology, 'at least one processor' as used herein is to be understood as covering both options, namely having one processor execute the all instructions or distributing the instructions for execution by two or more processors.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated. For purposes of this document, each process associated with the disclosed technology may be performed continuously or on an interrupted multi-tasking basis and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claimed subject matter.

What is claimed is:

1. A method for allowing patrons at premises of a provider of goods and/or services to pay and leave, the method comprising:
   recognizing charge-incurring activities within the premises that occur at corresponding locations and times, the recognizing not inherently determining specific identities of patrons who engaged in the recognized charge-incurring activities;
   based on the recognizing, producing a first digital record identifying a corresponding location and time of a recognized first of the charge-incurring activities and indicating a characterization of the recognized first charge-incurring activity;
   automatically repeatedly determining respective locations of sourcing and of times of detection of a patron-presence and patron-identifying advertising radio signal (P/PAS) repeatedly broadcast by a P/PAS emitter disposed in or near to a region of interest and possessed by a patron participating in the method, wherein the automatically repeatedly determining respective locations of sourcing and of times of detection of the P/PAS includes:
      detecting receipt of the P/PAS by one or more directional antennas;
      determining respective strengths of received P/PAS at two or more co-located ones of the directional antennas; and
      generating a confidence signal based on the determined respective strengths, the confidence signal indicating a level of confidence that the P/PAS emitter is disposed inside the region of interest or alternatively indicating a level of confidence that the P/PAS emitter is disposed outside the region of interest;
   producing respective second digital records identifying respective sourcing locations and times of detection of the P/PAS;
   matching one or more of the produced respective second digital records with the first digital record based on substantial spatial and temporal proximity of the corresponding location and time identified in the first digital record with the respective sourcing locations and times of the matched one or more respective second digital records;
   combining at least one of the matched second digital records with the first digital record to produce a corresponding combination result; and
   adding the corresponding combination result to an incurred charges list associated with the participating patron.

2. The method of claim 1, further comprising:
   using the incurred charges list for enabling payment for incurred charges on a pay-go-whenever-ready (PGWeR) basis that allows the participating patron to pay and leave whenever ready to do so without need for intervention by another person.

3. The method of claim 2, wherein the premises include food serving areas.

4. The method of claim 2, wherein the recognizing of charge-incurring activities includes recognizing that an order for serving of food originated from an area where an order placing patron is standing or sitting.

5. The method of claim 4, wherein the recognizing that the order for serving of food originated from the area does not specifically identify the patron who placed the order.

6. The method of claim 2, wherein the premises include supports from which items can be selectively removed by patrons, and wherein the recognizing of charge-incurring activities includes recognizing that an item has been removed from an identified support area.

7. The method of claim 6, wherein the recognizing that the item has been removed is performed by an automated removal detector that does not identify who removed the item.

8. The method of claim 1, wherein the indicated characterization of the recognized first charge-incurring activity identifies a charge amount to be associated with the recognized first charge-incurring activity.

9. The method of claim 1, wherein the indicated characterization of the recognized first charge-incurring activity identifies a type of good or service that was provided or requested by way of the recognized first charge-incurring activity.

10. The method of claim 1, wherein one or both of what constitutes the substantial spatial and substantial temporal proximity is dependent on an extant context.

11. The method of claim 10, wherein the extant context is a function of where in the provider's premises the charge-incurring activities are recognized to occur.

12. The method of claim 10, wherein the extant context is a function of what part of day or part of week the charge-incurring activities are recognized to occur.

13. The method of claim 10, wherein the extant context is a function of how crowded or how busy the provider's premises are when the charge-incurring activities are recognized to occur.

14. A computer system comprising one or more processors and a memory having collectively stored therein instructions that, when executed by the one or more processors, cause the one or more processors to execute a process that allows patrons at premises of a provider of goods and/or services to pay and leave, the executed process comprising:
   recognizing charge-incurring activities within the premises that occur at corresponding locations and times, the recognizing not inherently determining specific identities of patrons who engaged in the recognized charge-incurring activities;
   based on the recognizing, producing a first digital record identifying a corresponding location and time of a recognized first of the charge-incurring activities and indicating a characterization of the recognized first charge-incurring activity;
   automatically repeatedly determining respective locations of sourcing and of times of detection of a patron-presence and patron-identifying advertising radio signal (P/PAS) repeatedly broadcast by a P/PAS emitter disposed in or near to a region of interest and possessed by a patron participating in the method, wherein the automatically repeatedly determining respective locations of sourcing and of times of detection of the P/PAS includes:
      detecting receipt of the P/PAS by one or more directional antennas;
      determining respective strengths of received P/PAS at two or more co-located ones of the directional antennas; and
      generating a confidence signal based on the determined respective strengths, the confidence signal indicating a level of confidence that the P/PAS emitter is disposed inside the region of interest or alternatively indicating a level of confidence that the P/PAS emitter is disposed outside the region of interest;

producing respective second digital records identifying respective sourcing locations and times of detection of the P/PAS;

matching one or more of the produced respective second digital records with the first digital record based on substantial spatial and temporal proximity of the corresponding location and time identified in the first digital record with the respective sourcing locations and times of the matched one or more respective second digital records;

combining at least one of the matched second digital records with the first digital record to produce a corresponding combination result; and adding the corresponding combination result to an incurred charges list associated with the participating patron.

* * * * *